United States Patent
Jalali

(10) Patent No.: US 10,389,431 B2
(45) Date of Patent: Aug. 20, 2019

(54) AIR INTERFACE PROTOCOLS FOR BROADBAND ACCESS TO AERIAL PLATFORMS

(71) Applicant: Ahmad Jalali, Rancho Santa Fe, CA (US)

(72) Inventor: Ahmad Jalali, Rancho Santa Fe, CA (US)

( * ) Notice: Subject to any disclaimer, the term of this patent is extended or adjusted under 35 U.S.C. 154(b) by 0 days.

(21) Appl. No.: 16/205,641

(22) Filed: Nov. 30, 2018

(65) Prior Publication Data
US 2019/0173567 A1 Jun. 6, 2019

Related U.S. Application Data

(62) Division of application No. 15/906,483, filed on Feb. 27, 2018.

(60) Provisional application No. 62/593,754, filed on Dec. 1, 2017, provisional application No. 62/542,939, filed on Aug. 9, 2017, provisional application No. 62/480,485, filed on Apr. 2, 2017.

(51) Int. Cl.
| | |
|---|---|
| *H04B 7/212* | (2006.01) |
| *H04B 7/185* | (2006.01) |
| *H04L 27/36* | (2006.01) |
| *H04W 72/04* | (2009.01) |
| *H04W 72/08* | (2009.01) |
| *H04W 16/28* | (2009.01) |
| *H04W 84/00* | (2009.01) |

(52) U.S. Cl.
CPC ........ *H04B 7/18504* (2013.01); *H04W 16/28* (2013.01); *H04W 72/044* (2013.01); *H04W 72/085* (2013.01); *H04W 84/005* (2013.01)

(58) Field of Classification Search
CPC .............. H04B 7/18504; H04W 16/28; H04W 72/044; H04W 72/08; H04W 84/005
USPC .......................................................... 370/321
See application file for complete search history.

(56) References Cited

U.S. PATENT DOCUMENTS

| | | | | |
|---|---|---|---|---|
| 6,731,618 | B1 * | 5/2004 | Chung | H04L 1/0003 370/209 |
| 8,085,802 | B1 * | 12/2011 | Monk | H04L 5/0046 370/419 |
| 2001/0043572 | A1 * | 11/2001 | Bilgic | H04B 7/2615 370/281 |
| 2002/0066097 | A1 * | 5/2002 | Hattori | G06Q 30/0241 725/34 |
| 2002/0080902 | A1 * | 6/2002 | Kim | H04L 1/0069 375/377 |
| 2006/0129723 | A1 * | 6/2006 | Green | H04L 1/1887 710/106 |

(Continued)

*Primary Examiner* — Rafael Pérez-Gutiérrez
*Assistant Examiner* — Mark G. Panell
(74) *Attorney, Agent, or Firm* — Ahmad Jalali

(57) ABSTRACT

An air interface for a terrestrial communications network for providing broadband internet access to aerial platforms is described. In some embodiments, systems and methods are described for efficient retransmission of data packets that are not received correctly. In other embodiments, systems and methods are described for determining the modulation constellation and error correction code rate used in transmitting a data packet to maximize data rates. In another set of embodiments, the retransmission scheme and modulation constellation and error correction code rate determination are jointly optimized to maximize data rates.

10 Claims, 18 Drawing Sheets

(56) References Cited

U.S. PATENT DOCUMENTS

| | | | | |
|---|---|---|---|---|
| 2006/0198325 A1* | 9/2006 | Gao | .................... | H04L 1/0057 |
| | | | | 370/270 |
| 2007/0234170 A1* | 10/2007 | Shao | .................... | H04L 1/1874 |
| | | | | 714/746 |
| 2009/0201871 A1* | 8/2009 | Sambhwani | ...... | H04W 72/0406 |
| | | | | 370/329 |
| 2010/0061438 A1* | 3/2010 | Tan | .................... | H04L 1/0003 |
| | | | | 375/227 |
| 2010/0177684 A1* | 7/2010 | Kore | .................... | H04W 84/18 |
| | | | | 370/328 |
| 2011/0075641 A1* | 3/2011 | Siriwongpairat | ... | B61L 27/0005 |
| | | | | 370/337 |
| 2011/0131614 A1* | 6/2011 | Sayadi | .................... | H04H 20/33 |
| | | | | 725/62 |
| 2013/0121186 A1* | 5/2013 | Vajapeyam | ......... | H04W 72/085 |
| | | | | 370/252 |
| 2016/0156498 A1* | 6/2016 | Loghin | ................. | H04L 1/0042 |
| | | | | 375/298 |
| 2017/0230149 A1* | 8/2017 | Wang | .................... | H04L 1/0057 |

* cited by examiner

AIR INTERFACE PROTOCOLS FOR BROADBAND ACCESS TO AERIAL PLATFORMS

CROSS-REFERENCE

This application claims priority to co-owned and co-pending U.S. Utility application Ser. No. 15/906,483 filed Feb. 27, 2018 entitled: "WIRELESS COMMUNICATIONS SYSTEM FOR BROADBAND ACCESS TO AERIAL PLATFORMS", U.S. Utility application Ser. No. 15/897,018 filed Feb. 14, 2018 entitled: "COMMUNICATIONS SYSTEM FOR PROVIDING BROADBAND ACCESS TO AERIAL PLATFORMS', and U.S. Provisional Application Ser. No. 62/593,754 filed Dec. 1, 2017 entitled: "A WIRELESS COMMUNICATIONS SYSTEM FOR BROADBAND ACCESS TO AERIAL PLATFORMS", the contents of which are incorporated by reference in their entirety. This application is a divisional of U.S. Utility application Ser. No. 15/906,483 filed Feb. 27, 2018 entitled: "WIRELESS COMMUNICATIONS SYSTEM FOR BROADBAND ACCESS TO AERIAL PLATFORMS".

COPYRIGHT

A portion of the disclosure of this patent document contains material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever.

FIELD OF THE INVENTION

The present disclosure describes aspects of a system comprising of a network of terrestrial cell sites for broadband internet access to aerial platforms such as drones, general aviation, and commercial aircraft. The present disclosure describes systems and methods for the design of communications protocols between cell sites and aerial platforms, steering of the cell site antenna beams toward the aerial platforms, design and pointing of the aerial platform antenna beams toward the cell sites, assignment of aerial platforms to cell sites, and cell site sectorization.

BACKGROUND OF THE INVENTION

Broadband internet access to aerial platforms such as low altitude drones flying at an altitude of about 400 feet, and general aviation and commercial aircraft flying at altitudes of as high as 50,000 feet, has in recent years been of great interest. Two different approaches to providing broadband internet access to aircraft have been: a network of ground cell sites referred to as ATG (Air to Ground); satellite based aeronautical broadband access systems.

Communications systems using GSOs (Geo-Stationary Satellites) can provide ubiquitous internet access to aircraft over land as well as water. However, satellite-based systems are expensive means of providing broadband access to aircraft. ATG systems are a less expensive means of providing broadband access for aircraft flying over land. To provide ubiquitous and cost efficient broadband access to aircraft over land and oceans, a hybrid system consisting of a cost efficient ATG system for coverage over land, combined with a satellite-based system for coverage over water, is one candidate solution.

A well-known ATG system is the network of cell sites that is deployed and operated by Gogo in the 800 MHz band, and covers the CONUS (Continental US). This system has access only to 4 MHz of spectrum; this small amount of spectrum limits the data rate to each aircraft and the overall network throughput. In order to provide a high data rate and high throughput ATG system, larger amount of spectrum is needed. However, it is also important that the spectrum be inexpensive. Licensed spectrum that is usable for broadband access to smartphones and other consumer devices is too expensive to be used for ATG systems. Therefore, an inexpensive source of spectrum is needed for ATG systems.

There is a large amount of spectrum in frequency bands above 3 GHz. One source of spectrum for ATG service is the 5 GHz unlicensed band, specifically the so called UNII-1 (5.15 to 5.25 GHz) and UNII-3 (5.725 to 5.85 GHz) bands. The obvious benefit of using the unlicensed bands is that they do not require any license fees. However, since the spectrum is being used by multiple systems, techniques must be devised to mitigate interference from other systems into the ATG system, while meeting the FCC imposed EIRP (Effective Isotropic Radiated Power) limits in the unlicensed bands. There are also other sources of spectrum above 5 GHz such as the C band, or even higher bands, where an ATG system may be able to share the spectrum with another service. Signal attenuation due to propagation path loss and other atmospheric effects are high in higher frequencies, and techniques are required to mitigate these effects. Moreover, the objective is to provide very high data rates to the aircraft, similar to the data rates to which people are accustomed at home. Therefore, system and methods are required to develop a high throughput system specifically optimized for aerial platforms.

BRIEF DESCRIPTION OF THE SEVERAL VIEWS OF THE DRAWINGS

Some embodiments of the present invention are illustrated as an example, and are not limited by the accompanying figures. In the following figures, where appropriate, similar components are identified using the same reference label.

SUMMARY

Figure 1:
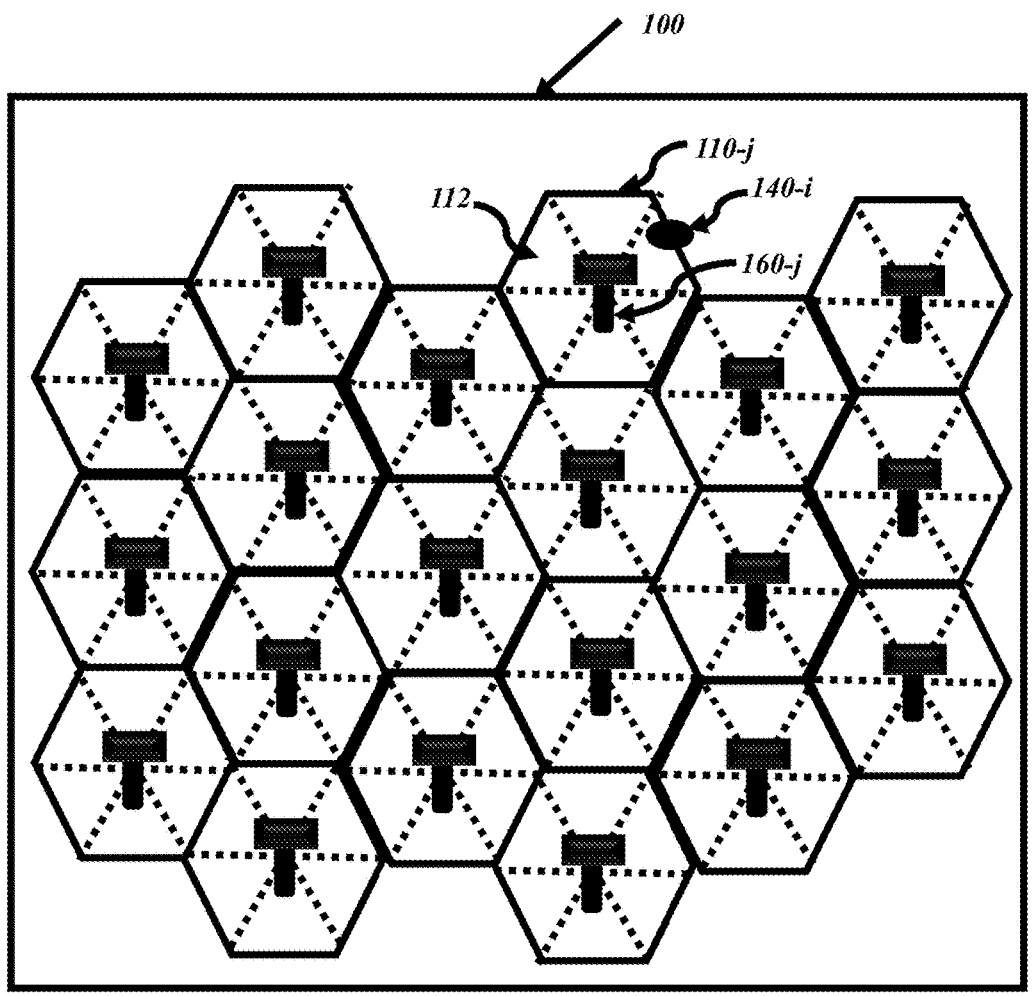
FIG. 1 illustrates an exemplary diagram of a network of cell sites for providing broadband internet access to aerial platforms of some embodiments.

A system to provide broadband access to aerial platforms, the system comprising: a network of cell sites that each comprise at least one radio transceiver, each radio transceiver transmitting at least a reference signal; a plurality of aerial platforms that each comprise a radio transceiver, each radio transceiver measures a signal quality metric of at least one reference signal: a set of Modulation Constellation and Code Rate (MCCR) indices, each MCCR signifying a modulation constellation and an error correction code rate used in encoding and modulating data packets; a forward link time structure that is divided into frames, each frame is further divided into a number of time slots, at least one data packet is transmitted in each frame where each data packet is identified by a sequence number; each aerial platform radio transceiver determines an MCCR with a highest data rate from a set of MCCRs that achieve a packet error rate below a specified threshold, given a signal quality value received at the aerial platform radio transceiver, and sends the determined MCCR to the cell site radio transceiver; each cell site radio transceiver encodes the data packets using the MCCR received from the aerial platform radio transceiver, and transmits the data packets to an aerial platform radio transceiver; the aerial platform radio transceiver sends an acknowledgment message to the cell site radio transceiver once the data packet is decoded correctly; and the cell site radio transceiver retransmits the data packet in each consecutive frame until an acknowledgement message is received for the data packet. In some embodiments, the signal quality metric used is SINR (Signal to Interference plus Noise Ratio).

In one embodiment, if an acknowledgment is not received by the cell site radio transceiver for a data packet, the cell site retransmits the data packet during a set of time slot positions within a frame that the data packet was sent in a first transmission. In another embodiment, the cell site radio transceivers arrange unacknowledged data packets in increasing sequence numbers and retransmit the said data packets in a frame consecutively, starting at the first time slot of the frame and in increasing sequence numbers. In another embodiment, each data packet is preceded by a preamble, the preamble contains the sequence number of the data packet, and the radio transceiver first decodes the preamble to determine the sequence number of the following data packet before decoding the data packet. In another embodiment, the cell site radio transceivers send a control packet in each frame that includes the sequence number and the time slots that each retransmitted data packet occupies in a frame, and each aerial platform radio transceiver decodes the control packet in order to determine the time slot positions of each retransmitted packet.

In some embodiments, the radio transceivers combine, in each symbol position of a data packet, the modulation symbols of a data packet and of retransmitted copies of the data packet to form a combined data packet, and decode the combined data packet and send an acknowledgement if the combined data packet is correctly decoded. In some embodiments, the aerial platform radio transceivers measure the received SINR (in dB) of the reference signal from a cell site radio transceiver, and choose an MCCR with a highest data rate from among MCCRs that achieve a packet error rate below a specified threshold for a SINR equal to the aforementioned measured SINR plus 3 dB.

In some embodiments, the cell site radio transceivers encode each data packet according to an MCCR into a number of redundancy symbols, divide the redundancy symbols into C, an integer, components, transmit each component sequentially in consecutive frames, and stop transmission of the components when an acknowledgement is received for the data packet from the aerial platform radio transceiver. In some embodiments, the aerial platform radio transceivers, after receiving each component of the data packet, decode a data packet using redundancy symbols of all received data packet components, and send an acknowledgement when the data packet is decoded correctly. In some embodiments, the aerial platform radio transceivers measure SINR of the reference signal sent by the cell site transceivers, and choose, for the measured SINR, an MCCR with a highest data rate from among MCCRs that achieve a packet error rate below a specified threshold when all components of the data packet are used in decoding of the data packet.

DETAILED DESCRIPTION OF THE INVENTION

The following detailed description is of the best currently contemplated modes of carrying out exemplary embodiments of the invention. The description is not to be taken in a limiting sense, but is made merely for the purpose of illustrating the general principles of the invention, as the scope of the invention is best defined by the appended claims.

Various inventive features are described below that can each be used independently of one another, or in combination with other features. Broadly, some embodiments of the present invention generally provide a way to communicate among a set of aerial platforms and a set of ground cell sites.

The present disclosure describes aspects of a system designed to provide broadband access to aerial platforms. Such aerial platforms may include, for instance, drones, UAVs, balloons, blimps, airships, general aviation, and commercial aircraft etc.

FIG. 1 illustrates an exemplary ground coverage area 100 divided into a contiguous set of smaller conceptual hexagonal coverage areas 110-$j$, and a cell site equipment 160-$j$ in each coverage area, j an integer index identifying different coverage areas and different cell site equipment of the same type. The network of cell sites and cell site equipment of FIG. 1 provide connectivity to aerial platforms 140-$i$, i an integer index identifying different aerial platforms of the same type. In the exemplary illustration of FIG. 1, the dotted lines in each cell coverage area 110-$j$ divide the cell area into six conceptual triangular areas 112, referred to as sectors. The reason for dividing the cell coverage area 110 into multiple smaller sectors 112 is to increase the overall network data throughput, and the number of aerial platforms that communicate with the cell site. Note that the cell coverage area may be divided into any number of sectors, 2, 3, 4 or more. The example of 6 sectors is used only for illustration purposes, a person of ordinary skill in the art will readily recognize that number of sectors other than 6 may be used without departing from the scope of the disclosure.

Cell Site Apparatus

Figure 2A:
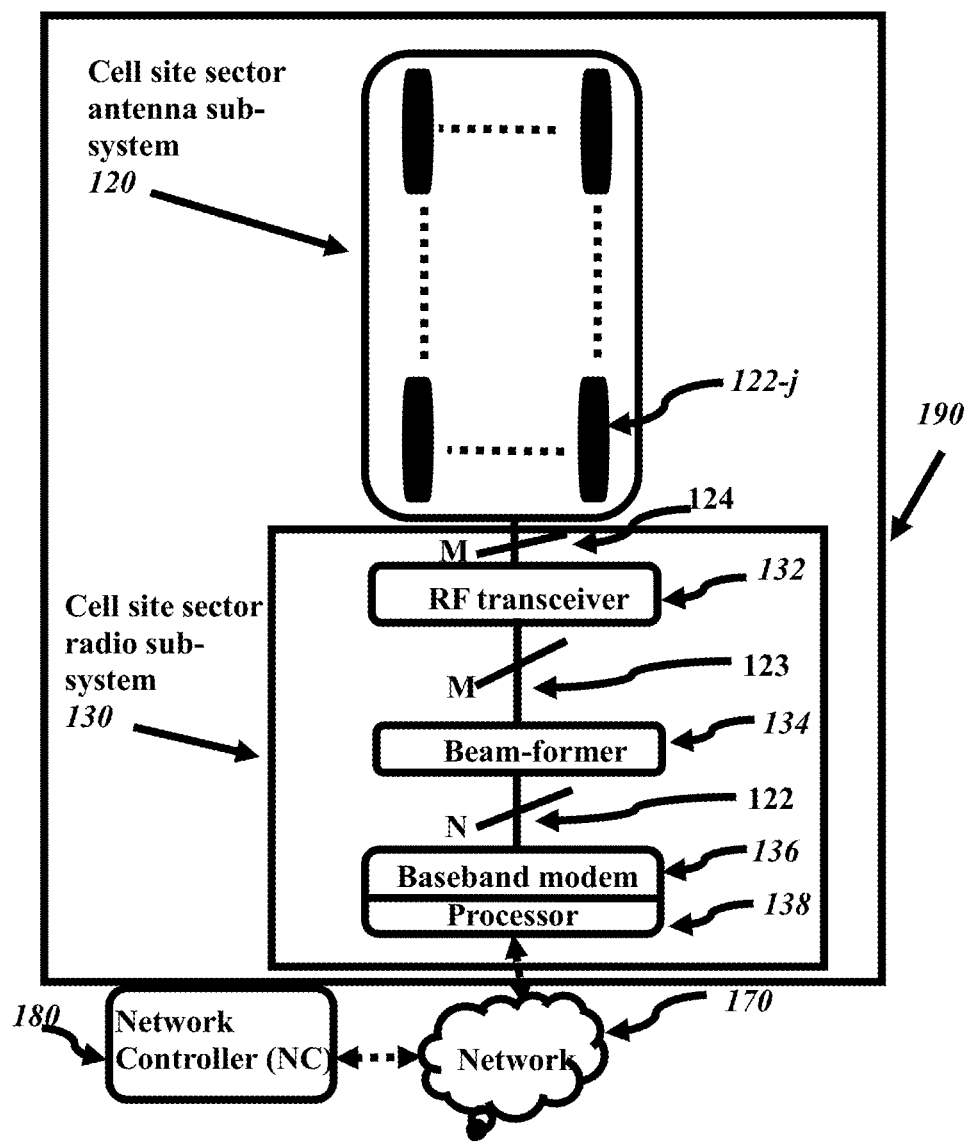
FIG. 2A illustrates an exemplary block diagram of communications equipment at the sector of a cell site, according to some embodiments.

FIG. 2A illustrates one exemplary embodiment of the cell site sector equipment 190 of one sector of a cell site. In the exemplary example of FIG. 1, where each cell site coverage area is divided into 6 sectors, there are 6 instantiations of cell site sector equipment 190 providing connectivity to aerial platforms in the corresponding sectors, comprising the cell site equipment 160. The cell site sector equipment 190 comprises two main sub-systems, the antenna sub-system 120, and the radio sub-system 130. The exemplary antenna sub-system 120 depicted in FIG. 2A is a panel composed of M antenna elements 122-j, j an integer index identifying different elements of the same type. The signals that are applied to the different elements 122-j of the antenna sub-system 120 are phased in such a way as to shape the antenna beam according to a desired pattern, and to point the peak of the beam in azimuth and in elevation toward a given aerial platform.

Some examples of the cell site antenna beam pattern shaping requirements are described next. There are two main signal paths from the aerial platform to the cell site, the line of sight signal path, and the reflection from the ground also referred to as the specular reflection. The line of sight and specular reflection may—depending on factors such as the distance between the transmitter and receiver, height of the cell site and drone antennas and the ground reflection coefficients—add destructively and cause fading to the signal at the receiver. One solution to mitigating fading due to ground reflection is to reduce the cell site antenna gain below horizon so that the ground reflection is attenuated. Furthermore, the cell site antenna gain toward the ground, i.e. below horizon, should be designed to be low in order to minimize interference to other devices that may be using the same frequency band on the ground. Therefore, one requirement is that the cell site antenna pattern be shaped to have low gain below horizon. Since the aerial platforms fly well above the horizon with respect to the cell sites, the cell site antenna gain above horizon determines the quality of communications link to the aerial platform. As the aerial platform distance from the cell site increases, the signal attenuation due to path loss also increases. Therefore, the cell site antenna gain needs to increase at larger distances, as the elevation angle from the cell site toward the aerial platform decreases, in order to compensate for the additional path loss. A cell site antenna pattern whose gain pattern above horizon at different locations from the cell site is shaped such as to compensate for the difference in the path loss at the corresponding locations, is said to have isoflux property. Therefore, the different antenna elements 122-j of the cell site antenna 120 are ideally phased to provide low gain below horizon, have approximate isoflux property above horizon over at least a certain range of elevation angles, and point the peak of the beam toward a given angular position in azimuth and elevation.

The cell site sector equipment radio sub-system 130, as depicted in FIG. 2A, comprises: an RF transceiver 132 that converts the baseband signal to RF frequency of operation; a beamformer sub-system 134 that determines the phases that need to be applied to signals destined to each antenna element to generate the beams for each sector; a baseband sub-system 136 that carries out baseband signal processing functions such as error correction encoding and decoding, modulation, and demodulation; and a processor sub-system 138 to implement functions such as upper layer protocols, assignment of radio resources such as cell site beams, frequency channels and time slots on each channel to aerial platforms, sector beam management, mobility management, and security features. The interface 122 between the baseband sub-system 136 and the beamformer sub-system 134 comprises of N streams of IQ samples, each stream corresponding to a one of the N data streams to be transmitted on the N beams formed by one antenna sub-system corresponding to one sector. In one embodiment, the baseband sub-system comprises of N baseband modems whereby each modem encodes the information for one cell site to aerial platform communication link using an error correction code, modulates the encoded data onto constellation symbols, and generates the IQ samples to be further processed by the beamformer sub-system. The interface 123 between the beamformer sub-system 134 and the RF transceiver sub-system 132 comprises of M streams of IQ samples, M being the number of antenna elements of the antenna aperture for one sector. In one embodiment, the beamformer sub-system generates M IQ sample streams according to $$c_j(n) = \sum_{i=1}^{N} d_i(n)\alpha_{ij}$$

where $d_i(n)$ is the encoded modulation symbols corresponding to the i-th data stream (1<i<N), n is the sampling time index, and $\alpha_{ij}$ (1<j<M) is the complex beamforming coefficients for the i-th beam corresponding to the i-th data stream. The beam former uses the coefficients $\alpha_{ij}$ computed by the processor sub-system to generate and send the IQ sample streams $c_j(n)$ (1<j<M) to the RF transceiver sub-system, where each stream is further modulated by the RF transceiver sub-system onto the carrier frequency and sent to one of the M antenna elements.

In one embodiment, the beamformer sub-system and the RF transceiver are co-located with the antenna sub-system. In another embodiment, the beamformer sub-system is co-located with the baseband sub-system, and the RF transceiver is co-located with the antenna sub-system. In one embodiment, the RF transceiver 132 is interfaced with the antenna elements using an RF interface 124 comprising of M RF signals, each signal sent to one of the M antenna elements. In another embodiment, the RF transceiver is implemented in a distributed manner whereby the IQ sample stream destined to a given antenna element is modulated onto the carrier frequency by an RF transceiver next to the said antenna element. The cell site sector equipment 190 is connected to the Network Controller (NC) sub-system 180 via network 170. The NC 180 coordinates activities such as handoff of aerial platforms from one cell site to another, sends configuration parameters to aerial platforms, configures the cell site equipment parameters, and implements network wide assignment of radio resources to aerial platforms as will be further discussed in the remainder of this disclosure. Note that the NC may alternatively be collocated with one of the cell sites, or be implemented by cell site equipment of one of the cell sites as long as NC has connectivity to other network elements for exchange of information.

Figure 2B:
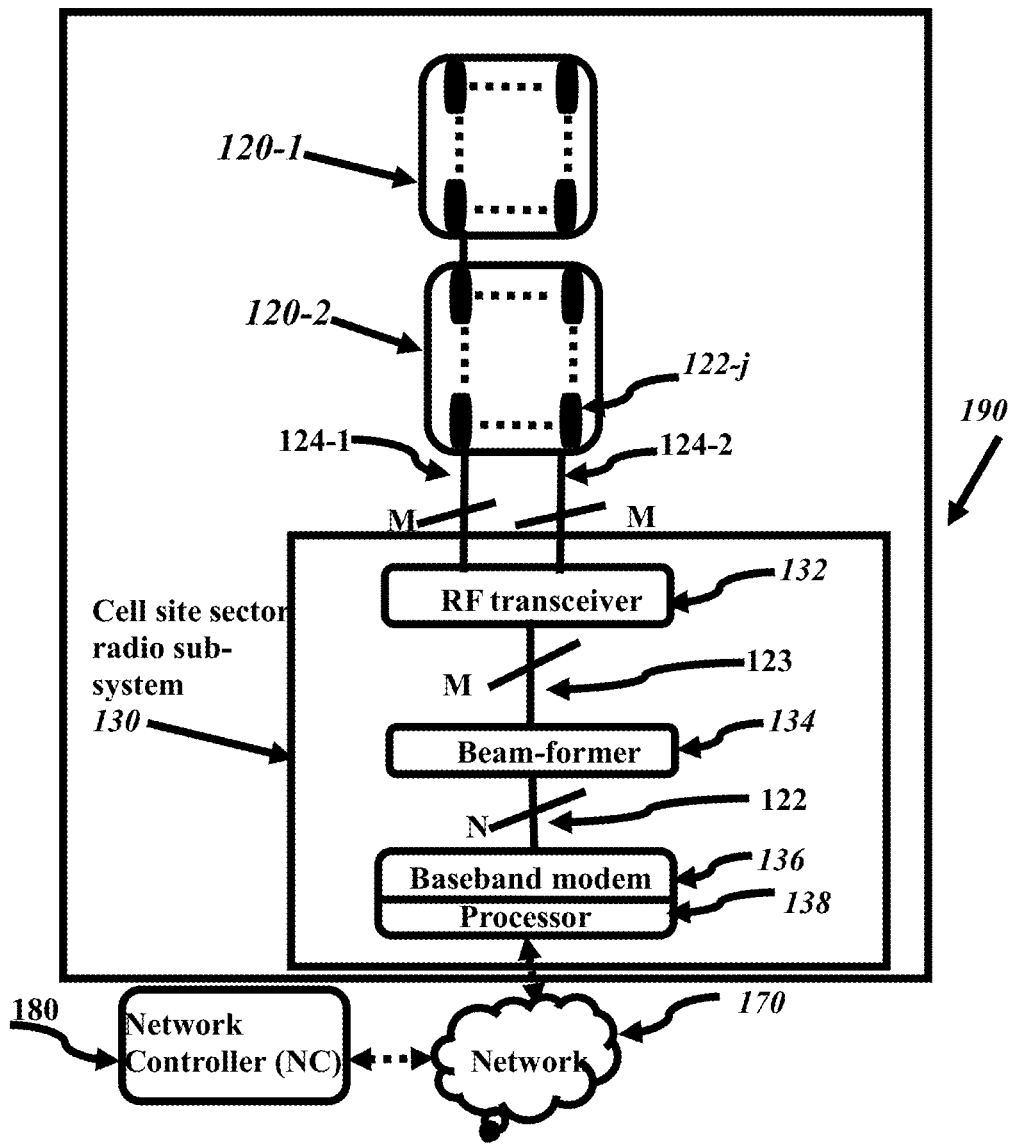
FIG. 2B illustrates an exemplary block diagram of communications equipment at the sector of a cell site, according to some embodiments.

The fading due to ground reflection described above is a function of the distance between the transmitter and the receiver, height of the aerial platform and cell sites antennas, and properties of the ground where reflection occurs. At some distances between the transmitter and the receiver, the line of sight and ground reflection signals even add constructively resulting in a stronger combined signal at the receiver. For the same transmitter and receiver distance, at some cell site antenna heights the signals may even add constructively. Therefore, it is advantageous to include multiple antenna apertures at the cell site to create diversity to help mitigate ground reflection induced fading. FIG. 2B illustrates a cell site sector equipment comprised of two antenna apertures 120-1 and 120-2, connected to the radio sub-system 130 via interfaces 124-1 and 124-2. A first antenna aperture 120-1 is placed above the second antenna aperture 120-2. In one embodiment, the cell site radio sub-system 130 estimates the signal quality received on the two antenna apertures from the aerial platform, and chooses the antenna aperture with stronger signal for communications with the aerial platform. In another embodiment, the cell site radio sub-system combines the signals from the two antennas using baseband signal processing techniques such as maximal ratio or maximum likelihood combining and uses the combined signal for demodulation.

The ground reflection induced fading is also present at the aerial platform receiver. If at a given time the cell site antenna is in a fade due to ground reflection, the aerial platform antenna may also be in fade. Also, even if at a given time the cell site antenna is not in fade, the aerial platform antenna may be in fade because of potentially different hardware induced delays on the cell site to aerial platform and aerial platform to cell site links, or if the cell site to aerial platform and aerial platform to cell site links use different frequency channels. Therefore, a mechanism is also needed to mitigate fading at the aerial platform antenna. In one embodiment, the cell site radio sub-system transmits to the aerial platform on the cell site antenna aperture from which it receives the highest signal power from the aerial platform. In another embodiment, the cell site radio sub-system sequentially transmits reference signals to the aerial platform on the two antennas where the reference signals identify what antenna they are sent on; the aerial platform radio sub-system estimates the signal strength received on each of the two reference signal transmissions from the cell site, and informs the cell site radio sub-system on which reference signal it receives a stronger signal. The cell site radio sub-system transmits to the aerial platform on the antenna aperture that the aerial platform receives a stronger signal. In another embodiment, the cell site radio sub-systems transmit to the aerial platform on both antennas by phasing the transmit signals on the two antennas such that the signals are in phase and add constructively at the aerial platform receiver. FIG. 2B, and the above description considered two antennas at the cell site. However, a person of ordinary skill in the art will readily recognize that the embodiments described in this disclosure can be described in conjunction with more than two antenna apertures without departing from the scope of the disclosure.

In one embodiment, the beamformer sub-system carries out the beam forming function digitally by applying appropriate phases to baseband signals destined to different antenna elements to form the desired beams in the sector. In another embodiment, the beamformer determines the phases for each antenna element to achieve the specified beam pattern, but the phases are applied at RF stage by the RF transceiver 132 or by the circuitries that are part of the antenna elements 122-$j$. The interface between the RF transceiver and the antenna elements is shown by RF interface sub-system 124. As will be described later in this disclosure, the beamformer 134, the RF transceiver 132 and the antenna sub-system 120 may form multiple simultaneous beams, with each beam pointing in a different direction toward different aerial platforms.

Aerial Platform Apparatus

Figure 3A:
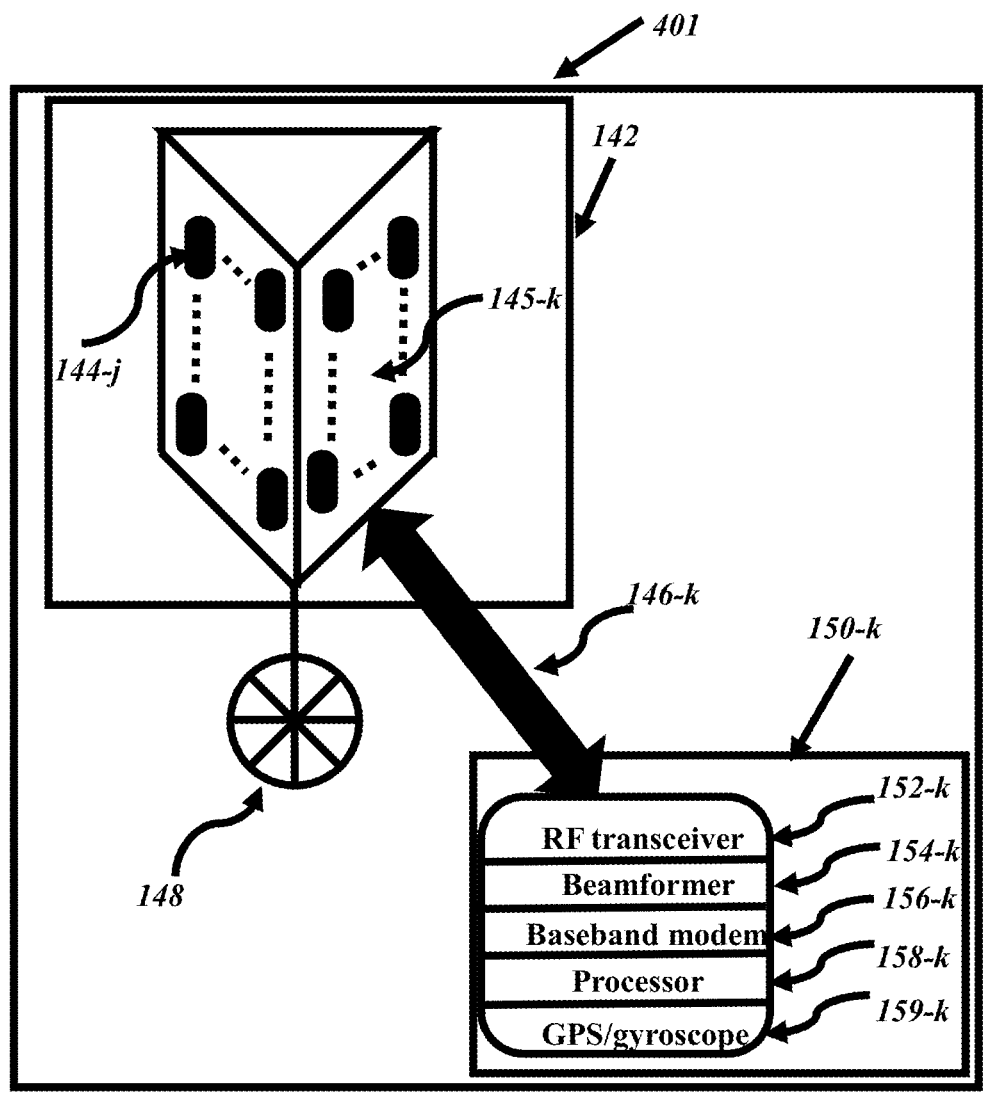
FIGS. 3A, 3B, and 3C illustrate exemplary block diagrams of the communications equipment of the aerial platforms, according to some embodiments.

FIG. 3A illustrates an exemplary aerial platform communications equipment comprising of two main sub-systems, an antenna sub-system 142, and a radio sub-system 150. The exemplary aerial platform antenna sub-system of FIG. 3A comprises of 3 antenna apertures 145-$k$, k an integer index identifying one of 3 different antenna apertures of the same type. Furthermore, the different antenna apertures may be tilted in different directions. In one embodiment of the antenna aperture 145, as illustrated in FIG. 3A, each antenna aperture further comprises of antenna elements 144-$j$, j identifying different antenna elements of the same type. Examples of antenna elements are dipole or patch elements. The different antenna elements 144-$j$ of a given antenna aperture may be phased to form a beam in a given azimuthal and elevation direction. In one embodiment, the antenna elements 144-$j$ are phased to form a fixed beam that does not change with time. The advantage of a fixed beam is simplicity of the antenna. In another embodiment, the antenna element phases are changed with time in order to more accurately steer the beam toward the cell site as the aerial platform moves and changes its orientation toward the cell site with which it is communicating. In another embodiment, the antenna aperture 145 may be designed using a single element structure, such as a horn structure, to form one fixed beam. The antenna aperture that forms a single fixed beam using a single element structure has the advantage of being simpler and less expensive. A person of ordinary skill in the art will readily recognize that more than 3 antenna apertures may be used for the antenna sub-system of the aerial platform without departing from the scope of the disclosure.

When the antenna aperture 145 is capable of only forming a single fixed beam, there will be antenna gain loss due to so called scan loss in cases where the antenna aperture does not align with the cell site with which the aerial platform is communicating. Even when the antenna aperture is capable of dynamically steering its beam toward the cell site, there will be scan loss whose magnitude depends on the aerial form's orientation with respect to the cell site location. The sub-system 148 of FIG. 3A, is a mechanical device that is capable of rotating the antenna sub-system 142 by a certain angle around its axis, in order to more accurately position the antenna beam toward a cell site. The mechanical device 148 may be a simple electromechanical switch which switches the antenna sub-system 142 to one of a few possible positions. This results in a simple and low weight mechanical switching device which is capable of turning the aerial platform antenna aperture beam toward the cell site with which it is communicating, thereby significantly reducing the scan loss. The aerial platform radio sub-system further comprises of an RF transceiver sub-system 152, a beam former sub-system 154, a baseband sub-system 156, a processor sub-system 158, and a GPS/gyroscope sub-system 159. The GPS/gyroscope sub-system 159 estimates the aerial platform's position location coordinates, as well as the aerial platform antenna sub-system orientation relative to the cell sites. Sub-system 146 provides an RF interface between the antenna sub-system 142 and the radio sub-system 150.

Figure 3B:
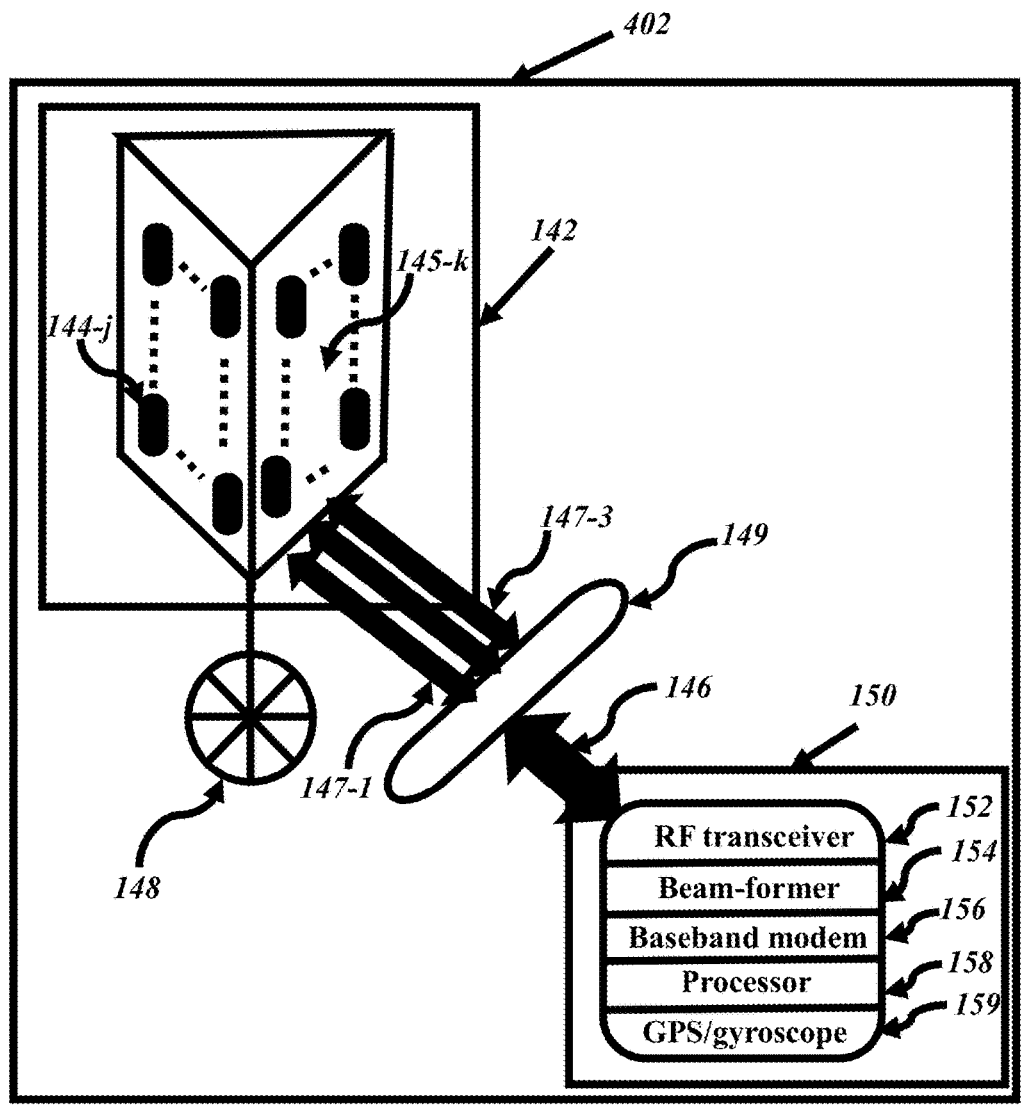

The aerial platform equipment 401 of FIG. 3A shows that each antenna aperture 145-$k$ is connected to a dedicated aerial platform radio sub-system 150-$k$, k an integer index identifying different antenna apertures and radio sub-systems of the same type. The advantage of having a dedicated radio sub-system for each antenna aperture is to facilitate mesh network capability for the aerial platforms, where one aerial platform maintains multiple simultaneous communications links in different azimuthal directions. In the mesh network configuration, one aerial platform may be simultaneously communicating with multiple aerial platforms or cell sites. It is possible to have a number of radio sub-systems fewer than the number of antenna apertures, and switch the radio sub-systems to the antenna apertures that are being used for communications. FIG. 3B illustrates an exemplary aerial platform communications equipment which comprises of only one radio sub-system 150. In the system of FIG. 3B, the single radio sub-system 150 is switched to an antenna aperture 145-*k* being used for communication, using the RF switching sub-system 149. The RF switching sub-system 149 has connections to all 3 antennas, and to the radio sub-system 150 via RF interfaces 147-1, 147-2, 147-3, and 146. In general, when there are fewer radio sub-systems than antenna apertures, the radio sub-systems may be shared by an antenna aperture using an RF switching sub-system such as in the exemplary diagram of FIG. 3B.

In the system of FIG. 3A, since there is a dedicated radio sub-system 150-*k* for each antenna aperture 145-*k*, one of the radio sub-systems 150-*k* needs to be identified as the master which receives all signal quality measurements from other radio sub-systems of the same aerial platform, determines the aerial platform antenna aperture from which the strongest signal quality is received, and instructs the aerial platform radio sub-system of the corresponding antenna aperture to start communications with the cell site sector from which the strongest signal quality is received. In the system of FIG. 3B where there is only one radio sub-system 150, the radio sub-system switches from one antenna aperture to the next, measures signal quality on reference signals received from cell sites on each antenna apertures, chooses the aerial platform antenna aperture on which it receives the highest signal quality, and establishes the communications link on the said antenna aperture and with the cell site from which the aerial platform antenna aperture receives the highest signal quality.

The aerial platform antenna sub-system described in conjunction with FIGS. 3A and 3B comprise of at least three antenna apertures to provide coverage in 360 degrees in azimuth using one of the antenna apertures. In another aerial platform antenna design for 360 degree coverage in azimuth, the antenna sub-system 142 comprises of only one antenna aperture and the mechanical steering mechanism 148 steers the antenna aperture in different azimuthal angles such as to point the antenna aperture beam toward a cell site with which the aerial platform radio sub-system is communicating, or to point the antenna aperture beam toward a cell site in order to measure the quality of the signal received from the said cell site. In order to minimize the size of the antenna fixture, the mechanical steering pivot from which the antenna is rotated in azimuth is placed in the center and under the single antenna aperture, and the antenna aperture is mechanically steered around the said pivot. In another aerial platform antenna sub-system embodiment, the antenna sub-system comprises of two antenna apertures. The two antenna apertures are placed back to back, each aperture covering an angular area of about 180 degrees, and the antenna apertures may be rotated in azimuth to point the peak of one of the apertures toward a cell site. The mechanical steering pivot is, as in the case of the single antenna aperture, placed in the center under the antenna apertures from which the antenna apertures may be rotated in azimuth. The angular mechanical steering range of the aforementioned two aperture antenna aperture sub-system is limited to 180 degrees which helps mitigate issues such as RF cable twisting.

Figure 3C:
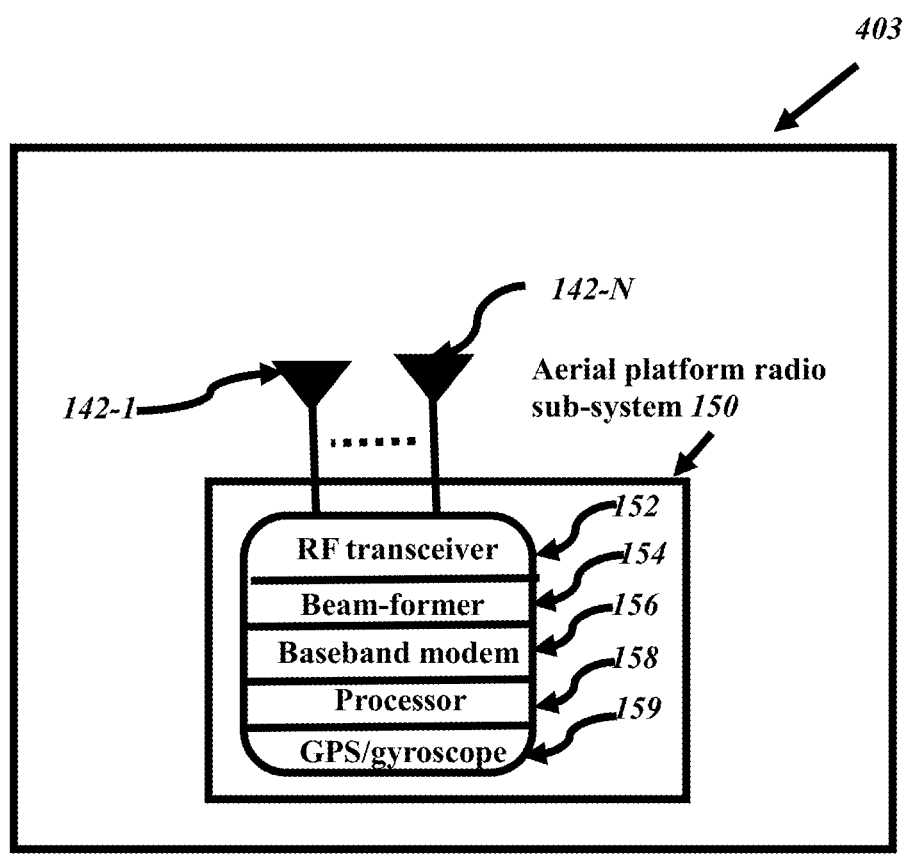

The embodiments in this disclosure are described in conjunction with FIGS. 3A and 3B. However, a person of ordinary skill in the art will readily recognize that the embodiments described in this disclosure can be described in conjunction with the mechanically steerable single antenna aperture system without departing from the scope of the disclosure. As was mentioned previously, certain aerial platforms such as low attitude drones, e.g. the ones used for surveillance, may impose a weight and size limitation for the communications equipment on the drone. For these aerial platforms, the antenna sub-system may consist of one or more Omni-directional antennas. FIG. 3C illustrates an aerial platform communications equipment which comprises of Omni antennas labeled by 142-*j*, j an index identifying different instantiations of the Omni antennas of the same type. Depending on the size and weight requirements of the drone, the drone antenna sub-system may consist of as few as one Omni antenna. If the aerial platform antenna sub-system consists of multiple Omni antennas, then the multiple antennas may be combined on the receive side to increase the antenna gain toward the desired cell site with which the aerial platform is communicating. Similarly, the signal transmitted by the aerial platform radio sub-system may be sent on the multiple antennas by appropriately phasing the transmit signals to form a beam toward the desired cell site.

The baseband modem of sub-system 136 in FIGS. 2A and 2B of the cell site equipment, and baseband modem sub-system 156 in FIGS. 3A, 3B and 3C of the aerial platform further comprise of a modulator and a demodulator sub-system. The modulator sub-system further comprises of at least the following sub-systems: an error correction encoder that encodes the information bits to be transmitted in a data packet into a set of coded symbols; the modulation symbol mapper/interleaver, which in some embodiments interleaves the coded symbols, maps the interleaved coded symbols into modulation symbols, and in some embodiments, interleaves the resulting modulation symbols. The demodulator sub-system further comprises of at least the following sub-systems: a deinterleaver/demapper, which in some embodiments deinterleaves the received modulations symbols, demaps the received modulation symbols into coded symbols, and in some embodiments deinterleaves the resulting coded symbols; and a decoder which decodes the coded symbols of a data packet to recover the original information.

Air Interface Protocol—Data Channels Types, Frame Formats and Timing

Figure 4A:
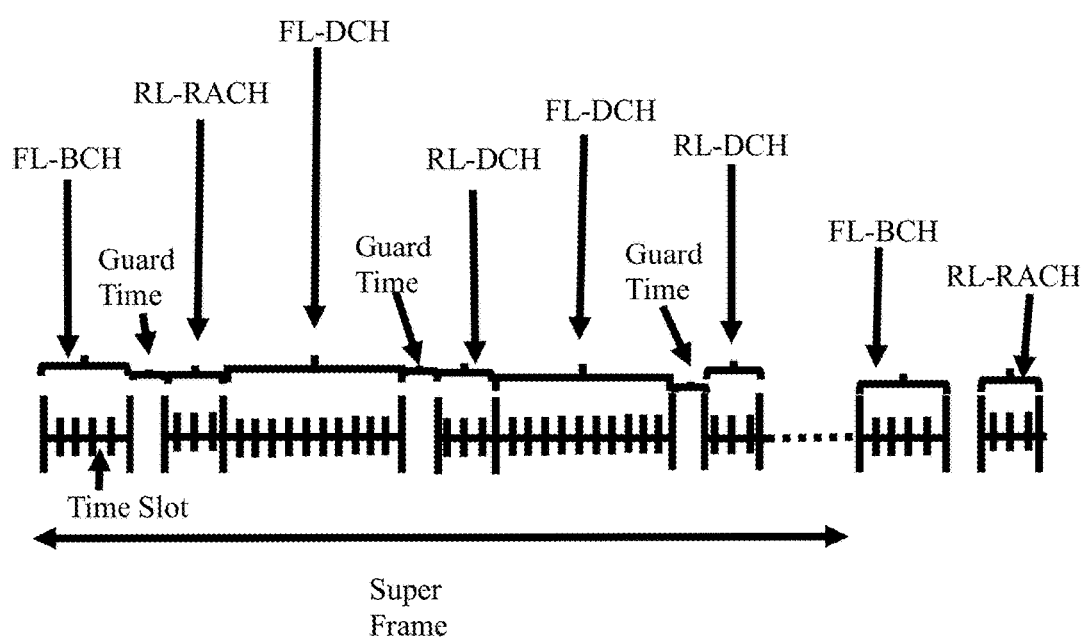
FIGS. 4A, 4B, 4C and 4D illustrate exemplary frame structures for the communications protocol according to some embodiments.

FIG. 4A illustrates the frame structure on the forward link (cell site to aerial platform) and return link (aerial platform to cell site), the forward link and return link channel types, frame types, time slots, and frame and time slot timing for a TDD (Time Division Duplex) system. In a TDD system, the forward link and return link data are sent on the same frequency channel but during different time frames. The Forward Link Broadcast CHannel (FL-BCH) (FIG. 4A) carries messages such as the system parameters, registration request response, and return link bandwidth assignment. The FL-BCH frame starts with a known preamble, which the aerial platform radio sub-system searches to acquire the cell site signal and to decode the FL-BCH messages. Each sector and sub-sector of a cell site has its own unique preamble on the FL-BCH channel. FL-BCH system parameter message contains information on the forward link and return link frame structure, frames types, frame durations, and time slots. The FL-BCH channels are followed by a guard time greater than the largest Round Trip Propagation Delay (RTPD) from the cell site to the aerial platforms. The guard time is then followed by reception of the Return Link Random-Access Channel (RL-RACH) on which different aerial platforms send registration request messages, return link bandwidth request messages, and other system control messages. Note that the frame timeline in FIG. 4A is shown from perspective of the cell site radio sub-system. Each frame on the forward link or return link is further divided into time slots. The longer vertical lines in FIG. 4A delineate the different channel frame durations, and the smaller vertical lines delineate time slots within each frame. As can be seen in FIG. 4A, there are two types of forward link channels, the aforementioned FL-BCH, and the Forward Link Data CHannel (FL-DCH) on which data is transmitted to the aerial platforms. Similarly, there are two return link channels, the aforementioned RL-RACH channel, and the Return Link Data CHannel (RL-DCH) where aerial platforms transmit data to the cell sites during time slots previously assigned to each aerial platform. A super frame (FIG. 4A) starts with a FL-BCH, followed by the RL-RACH and then a number of pairs of FL-DCH and RL-DCH frames. Therefore, the aerial platforms that have not yet established a link to the network have the opportunity to associate with a cell site at the beginning of each super frame.

Following the end of reception of the last forward link data packet and prior to the beginning of the transmission on the return link during the aerial platform's assigned return link time slots, each aerial platform will delay its transmission by the difference between the largest Round Trip Propagation Delay (RTPD) between the cell site and the aerial platforms, and the RTPD of the said aerial platform. In one embodiment, an aerial platform uses knowledge of its own position location coordinates, as well as those of the cell site with which the aerial platform is communicating, to determine the required amount of delay prior to return link transmission to ensure that the RTPD from the cell site to the said aerial platform is equal to the largest RTPD. In another embodiment, the cell site radio sub-system estimates the time of arrival of the signal from each aerial platform, determines the amount of additional delay required prior to the return link transmission of each aerial platform to ensure all cell site to aerial platform links incur the same maximum RTPD, and sends the computed required delay to each aerial platform. The aerial platforms delay their return link transmissions according to the required values received from the cell site radio sub-system. Therefore, once the cell site stops transmitting on the forward link, there will be a gap (guard time) equal to the largest RTPD from cell site to the aerial platforms before the beginning of arrival of signal from an aerial platform at the cell site. During the guard time gaps, the cell site is neither transmitting nor receiving, and is therefore wasted bandwidth. The guard time synchronizes the forward and return link transmissions, which helps avoid interference from the transmitter into the receiver when cell site starts receiving data. In an FDD (Frequency Division Duplex) system, where the aerial platforms simultaneously transmit and receive on different frequency channels on the forward and return links, there is no need for a guard time.

In one embodiment, the data-link between a cell site and an aerial platform consists of a point to point link, whereby the cell site transmits data to the aerial platform on the FL-DCH frame, the aerial platform transmits data to the cell site during the following RL-DCH frame, and a given pair of consecutive FL-DCH and RL-DCH frames are dedicated to one aerial platform. If the boresights of the beams covering two aerial platforms are separated by less than a certain azimuthal angular value, then to reduce crossbeam interference between the said beams the two aerial platforms may send/receive data to/from the cell site in one of the following ways. In one embodiment, the beam covering the first aerial platform may also be used to communicate with the second aerial platform by sharing the FL-DCH and RL-DCH frame time slots between the two aerial platforms.

In another embodiment, depending on the traffic requirements of the two aerial platforms, a certain fraction of the FL-DCH and RL-DCH frame pairs mentioned above are dedicated to each of the two aerial platforms; each aerial platform transmits and receives data during its dedicated FL-DCH and RL-DCH frame pairs. The aerial platforms are informed of their FL-DCH and RL-DCH frame pair allocations, and the position of the FL-DCH and RL-DCH frame pairs within the super frame using messages send to the aerial platforms via the FL-BCH or FL-DCH channels. In another embodiment, the frequency channel is divided into two frequency channels, and each frequency channel is assigned to one of the two aerial platforms.

In one approach to the development of the aforementioned communications protocol, the 802.11 (also known as WiFi) standard is used as the air interface building block, and is modified to implement the air interface specification. The 802.11 standard uses CSMA (Carrier Sense Multiple Access) as the primary multiple access technique. In CSMA, each Access Point (AP) and Client Terminal (CT) prior to data transmission measures the total received power on a given frequency channel, and if the measured power is below a certain threshold, then the AP/CT determines that the frequency channel is idle and begins transmission on the said frequency channel only if the channel remains idle for a certain random back-off time. In the system of this disclosure, the aerial platform is the CT and the cell site equipment is the AP. The back-off time is used to avoid having two APs/CTs access the idle channel at the same time, which would result in a collision. For the CSMA scheme to work well, each AP/CT needs to be able to receive signals transmitted by any other AP/CT. In some embodiments, aerial platforms (equivalent of CTs) and cell sites (equivalent of APs) use narrow antenna beams, which implies a given aerial platform may not be able to detect signals transmitted by other aerial platforms. Therefore, if 802.11 protocol is used as the building block for implementing the aforementioned air interface for aerial platforms, the CSMA mechanism must be turned off and replaced by the FL-BCH, FL-DCH, RL-RACH, and RL-DCH channels, the frame structures, and signaling protocols described in previous embodiments. The aerial platforms, as described previously, detect the FL-BCH channel transmitted a by a cell site, receive the system frame timing and RL-RACH channel timing from the FL-BCH messages, and send their association request message on the RL-RACH to the cell site, thereby avoiding the need for a CSMA mechanism. If there is a message collision on the RL-RACH, then the aerial platforms involved in the collision retransmit their messages during the next RL-RACH frame, but each aerial platform backs off its retransmission by a random number of time slots (backoff time) in order to minimize probability of collision.

In the 802.11 protocol, each AP/CT after transmitting a number of data packets stops transmission, and waits for acknowledgement of the transmitted data packets from the other end of the link. In a TDD system, the sequence of transmit and receive frames will result in a guard time between the two frames. In a local area network where coverage radius is 100 meters or less, the guard time is at most a few micro-seconds. In the aerial platform communications system described in this disclosure, however, coverage radius of one cell site may be as much as 300 km resulting in a guard time requirement of 2 milli-seconds or more. Therefore, the transmit/receive phases between APs and CTs of a nominal 802.11 network will result in a large guard time overhead. In order to minimize the impact of the guard time overhead, the aforementioned communications protocol for aerial platforms divides the time into sequences of a FL-DCH followed by a RL-DCH frame, and the duration of the FL-DCH and RL-DCH frames may be chosen to be large enough to make the guard time overhead needed between the two frames relatively small.

Air Interface Protocol—Retransmission Protocols

The correct reception of each data packet must be acknowledged by the receiver in order to ensure error free data transmission. A retransmission mechanism, referred to as Retransmission Protocol (RP) in this disclosure, is required to retransmit the data packets that are not received correctly. In one embodiment, the acknowledgements for the data packets received from aerial platform/cell site in one RL-DCH/FL-DCH frame are sent to the cell aerial platform/cell site in one acknowledgement packet during the following FL-DCH/RL-DCH frame. In one embodiment, the acknowledgment packet contains the sequence number of data packets that were not received correctly in the previous frame, i.e. the sequence number of data packets that are missing in the receiver buffer. In a variation of this embodiment, the receiver maintains the received modulation symbols for all data packets in a buffer, and removes the modulation symbols corresponding to a data packet from the receiver buffer only after receiving an acknowledgement for the said data packet sequence number. In each data frame, the transmitter resends all data packets which have not been acknowledged by the receiver side. The receiver combines the modulation symbols corresponding to a retransmitted data packet with the corresponding modulation symbols of the same symbol position of the data packet with the same sequence number maintained in the receiver buffer from the previous transmission, and sends the combined modulations symbols to the decoder sub-system of the baseband modem to decode the corresponding data packet and recover the original transmitted information. Combing of the two modulation symbols corresponding to the same symbol position of two transmissions of the same data packet may be carried out using a number of signal processing techniques such as maximal ratio combing, or maximum likelihood combining to maximize the received signal strength or the received Signal to Interference plus Noise Ratio (SINR). The combined modulation symbols have more signal power than the same modulation symbols of each of the two individual transmissions of the same data packet, and the decoder will have a higher probability of correctly decoding the data packet using the combined modulation symbols.

Figure 4B:
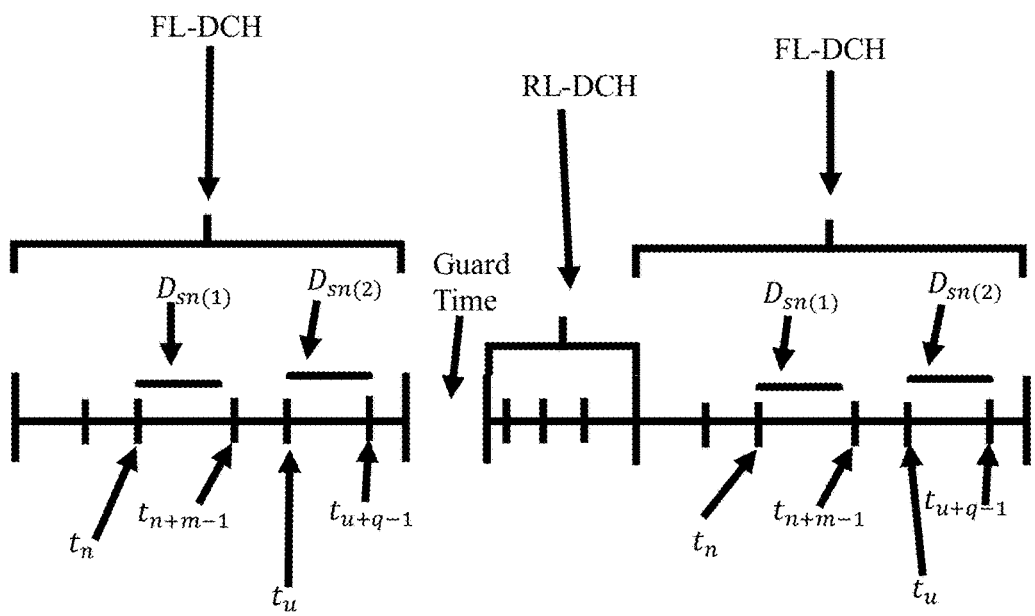

In air interface protocol versions where the sequence number of data packets is part of the data packet and is encoded with the data packet's information symbols, a mechanism is needed to determine the sequence number of the retransmitted data packets without having to decode the said data packets, so that the retransmitted data packet modulation symbols may be combined with the modulation of the previously transmitted data packet with the same sequence number. In one embodiment, the data packet that is being retransmitted is sent in the same time slots of the data frame where the data packet with the same sequence number had been sent in the previous data frame as illustrated in FIG. 4B. FIG. 4B shows two consecutive FL-DCH frames. The sequence number of data packets range from 1 to L, where L is an integer indicating the largest sequence number, and is identified by sn(l). Labels $D_{sn(1)}$ and $D_{sn(2)}$ in FIG. 4B refer to two data packets with increasing sequence numbers sn(1) and sn(2). Label $t_n$ identifies the n-th time slot, where time slots in each frame begin with time slot number 1. Data packets $D_{sn(1)}$ and $D_{sn(2)}$ shown in FIG. 4B are of length m and q time slots respectively, are sent during time slots $t_n$ to $t_{n+m-1}$ and $t_u$ to $t_{u+q-1}$ in the first FL-DCH frame, and are assumed not to have been decoded correctly after the first transmission. These packets, as can be seen in FIG. 4B, are retransmitted in the second FL-DCH during the same time slots of the FL-DCH frame as the first transmission. Then, the receiver expects to receive the data packet corresponding to a missing sequence number in the same set of time slots of the frame where the said sequence number had been transmitted previously, and combines the modulation symbols of the data packet in the buffer with the newly received modulation symbols of the data packet with the same sequence number.

Figure 4C:
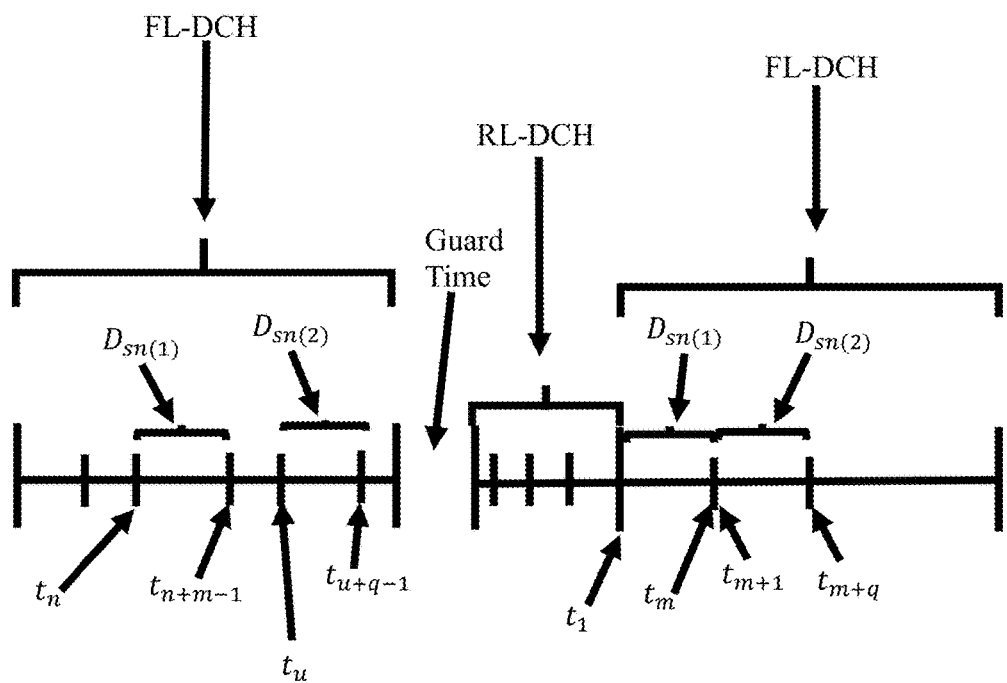

In another embodiment, the retransmitted data packets are placed at the beginning of the FL-DCH frame according to an increasing or decreasing sequence number convention. In FIG. 4C, it is assumed the data packets are retransmitted according to an increasing sequence number order. As illustrated by FIG. 4C, data packets $D_{sn(1)}$ and $D_{sn(2)}$ whose sequence numbers sn(1) and sn(2) are assumed to be in increasing order are retransmitted at the beginning of the second FL-DCH frame in the same order, and occupy the same number of time slots m and q, but this time they occupy time slots $t_1$ to $t_m$ and $t_{m+1}$ to $t_{m+q}$. Then, the receiver lists the sequence numbers of the missing data packets according to the same increasing or decreasing sequence number convention, and demodulates the retransmitted data packets of each missing sequence number in the time slots of the data frame according to the said list, and combines their modulation symbols with those of the previously transmitted data packet with the same sequence number that is in the receiver buffer memory. The RPs in the above embodiments were described using the example of FIGS. 4B and 4C where one retransmitted data packet is combined with the original unacknowledged data packet. A person of ordinary skill in the art will readily recognize that the same systems and methods for retransmission of data packets also apply to the case of more than one retransmission of the same data packet, without departing from the scope of this disclosure.

Figure 4D:
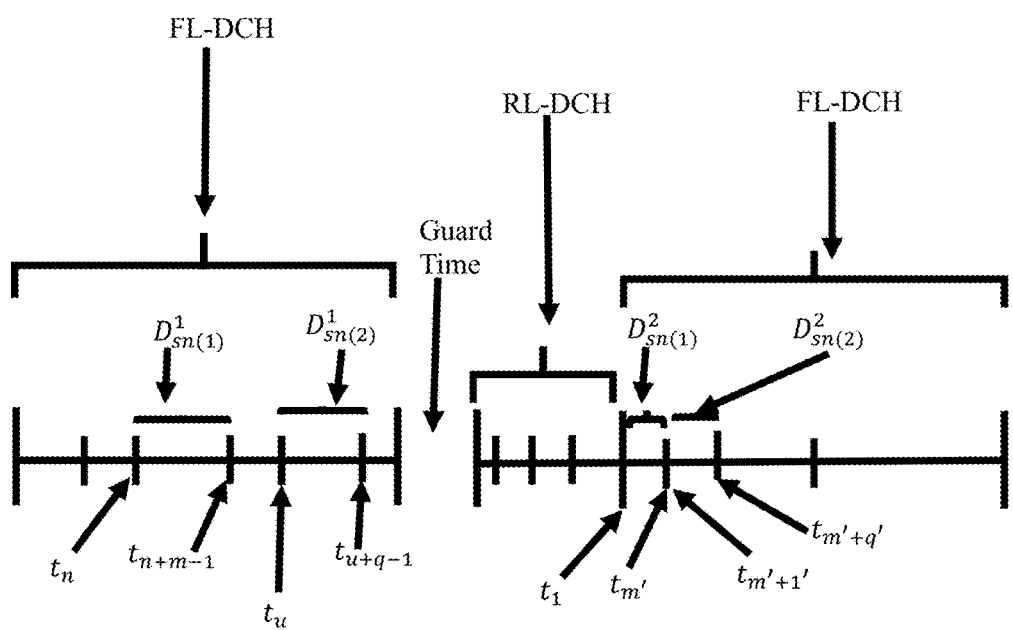

In another RP embodiment, the data packet with sequence number sn(l) is encoded using an error correction code, and the encoded data packet is divided into C, an integer number, components labeled by $D_{sn(l)}^c$, $1 < c \leq C$. The data packet components are transmitted sequentially in increasing index c in consecutive FL-DCH frames, one component per frame. After reception of each component of the data packet, the receiver attempts to decode the data packet using all received components of the same data packet, and sends an acknowledgment to the transmitter once the data packet is correctly decoded. Once an acknowledgement is received for a data packet sequence number, transmission of remaining components of the acknowledged data packet is aborted. The RP scheme just described is referred to an Incremental Redundancy RP (IR-RP) because the transmitter sends incremental amounts of redundancy until the receiver successfully decodes the data packets using all received redundancy information. Note that different components of a data packet need not be of the same size. In one embodiment, the data packet is encoded using an error correction code, the first component is the largest and includes the original data information plus a certain number of redundancy symbols, and the following components carry incremental amounts of the remaining redundancy symbols from the encoded symbols. The receiver maintains all components of each data packet in the receiver buffer until the data packet is correctly decoded, at which time the components of the correctly decoded data packet are removed from the buffer. FIG. 4D illustrates transmission of two components of two data packets with sequence numbers sn(1) and sn(2). As can be seen, the first components are of length m and q time slots, and the second components are of length m'<m and q'<q.

In a variation of the above RP embodiments, the sequence number of each packet is placed outside the information portion of the data packet so that the sequence number of the data packet may be determined prior to decoding of the data packet. In one embodiment, each data packet is preceded by a preamble which contains the sequence number of each data packet. The preamble is detected and decoded first, and the sequence number of the data packet following the preamble is determined. Once sequence number of each received data packet is determined, the multiple data packets corresponding to the same sequence number are sent to the decoder to recover the information data. In another embodiment, a control packet which contains the sequence number and the time slots that each data packet occupies in the corresponding frame is placed at the beginning of each FL-DCH or RL-DCH frame. The receiver decodes the control packet first, and retrieves the sequence number and location of each data packet in the frame; then, multiple data packets corresponding to the same sequence number are sent to the decoder to recover the information data as described in previous embodiments. The above retransmission mechanism embodiments were described in conjunctions with FIGS. 4B, 4C, and 4D, for forward link data packet transmission where the aerial platform is the receiver and the cell site is the transmitter. A person of ordinary skill in the art will readily recognize that the same systems and methods for retransmission of data packets also apply to the return link, where the aerial platform is the transmitter and the cell site is the receiver, without departing from the scope of the disclosure.

Air Interface Protocol—Modulation Constellation and Code Rate (MCCR) Determination The aerial platform and the cell site radio sub-systems may choose from a set of Modulation Constellations and error correction Code Rates (MCCRs) with which to encode and modulate the information to generate a coded data packet to transmit. In addition to the MCCR, the transmitter also chooses an RP (Retransmission Protocol), such as the ones described in previous embodiments. The higher the modulation constellation and the higher the error correction code rate, the higher the data rate. However, higher modulation constellation and higher code rates also require higher received Signal to Interference plus Noise Ratio (SINR) to reliably decode the data packets. Packet Error rate (PER) is a function of the MCCR and the received SINR. The MCCR and an accompanying RP must be chosen so that the PER after all retransmissions be below an a-priori PER threshold, $T_{PER}$, at a given SINR. Some upper layer network protocols, such as TCP, use window-based flow control mechanisms where a maximum number of unacknowledged data packets equal to the window size are allowed at a given time. When the window becomes full, some protocols adaptively reduce the window size to reduce congestion in the network, which results in the reduction of data rate at the source. In order to minimize the probability of window size reduction, in some systems $T_{PER}$ of as low as $10^4$ is chosen. In other words, upper layer network protocols are usually designed for wireline communications systems where data packet loss is very low. In one wireless communications link management methodology, the MCCR and the RP are chosen such that the PER seen by the upper layer network protocol is as low as the data packet loss in wireline networks.

Let $MCCR$ denote the i-th MCCR in the list of available MCCRs, and $DR_i$ be the data rate corresponding to the $MCCR_i$. In one embodiment for MCCR determination, the RP retransmits the whole data packet as described above in conjunction with FIGS. 4B and 4C and the receiver combines modulation symbols of the multiple copies of the same data packet. The MCCR whose index i maximizes the average data rate subject to $$PER(MCCR_i, SINR+3 \text{ dB}) < T_{PER}, \quad (2)$$

is used at the given SINR, where $PER(MCCR_i, SINR)$ is the PER of MCCR at the given SINR in dB scale. The average data rate is approximately given by $$DR_i \times (1 - PER(MCCR_i, SINR)) + 0.5 DR_i \times \quad (3)$$
$$PER(MCCR_i, SINR) \times (1 - PER(MCCR_i, SINR + 3 \text{ dB})) \cong$$
$$DR_i \times (1 - 0.5 \times PER(MCCR_i, SINR)).$$

In one embodiment, the MCCR whose index i maximizes the right-hand side of (3) subject to condition (2) is used by the transmitter to encode the data packets prior to transmission. This optimization criterion chooses an MCCR so that after one retransmission of the data packet PER be $<T_{PER}$. Note that in an AWGN communications channel, after one retransmission the receiver measures SINR+3 dB because per the retransmission mechanism the receiver combines the modulation symbols of the same symbol position of the two transmissions, thereby increasing the SINR by 3 dB.

The RP and MCCR determination embodiments described above in conjunction with FIGS. 4B and 4C considered the case of one retransmission of the data packet. A person of ordinary skill in the art will readily recognize that the same systems and methods for retransmission of data packets and for MCCR determination also apply in conjunction with more than one retransmission of the same data packet, without departing from the scope of the disclosure.

For an IR-RP mechanism described above in conjunction with FIG. 4D and with C=3 data packet components, the initial MCCR index i is chosen such that the PER after the second retransmission is below $T_{PER}$. Note that in the IR-RP of FIG. 4D, the effective MCCR of the combined transmissions changes after retransmission of each component because after each retransmission the effective error correction code rate of the combined transmissions is reduced. Therefore, the 3 MCCRs are denoted by $MCCR_i$, $MCCR_{i'}$, and $MCCR_{i''}$, corresponding to the MCCR of the first component transmission, MCCR of the first and second component transmissions combined, and that of the combined three components. Then, average data rate is maximized over all MCCR indices i subject to $$PER(MCCR_{i''}, SINR) < T_{PER}. \quad (4)$$

The average data rate in the IR-RP with 3 retransmissions (C=3) is approximately given by $$DR_i \times (1-PER(MCCR_i, SINR)) + DR_{i'} \times PER(MCCR_i, SINR) \times (1-PER(MCCR_{i'}, SINR)) + DR_{i''} \times PER(MCCR_i, SINR) \times PER(MCCR_{i'}, SINR) \times (1-PER(MCCR_{i''}, SINR)), \quad (5)$$

where $DR_i, DR_{i'}$ and $DR_{i''}$ are data rates corresponding to $MCCR_i$, $MCCR_{i'}$ and $MCCR_{i''}$. In one MCCR determination embodiment corresponding to IR-RP with C=3, the MCCR index i that maximizes (5) subject to (4) is used at the given SINR. For C=2, the average data rate is approximated by $$DR_i \times (1-PER(MCCR_i, SINR)) + DR_{i'} \times PER(MCCR_i, SINR) \times (1-PER(MCCR_{i'}, SINR)). \quad (6)$$

In one MCCR determination embodiment corresponding to IR-RP with C=2, the MCCR index i that maximizes (6)

subject to $PER(MCCR_i, SINR) < T_{PER}$ is used at the given SINR. The systems and methods for MCCR determination corresponding to IR-RP were described for C=2 and C=3. A person of ordinary skill in the art will readily recognize that the same systems and methods also apply to the case of C>3, without departing from the scope of the disclosure.

In one embodiment, in order to increase the probability of correct reception of missing data packets in the receiver buffer, the transmitter allocates more power to the beams during retransmission of data packets. In certain frequency bands, such as the U-NII-3 and U-NII-1 bands in the 5 GHz ISM band, there is a limit on the total conducted power into the antenna fixture which is shared by multiple beams formed by the antenna fixture. In one embodiment, the available power is equally allocated to the N different beams formed by one antenna fixture, referred to as the nominal beam power. In another embodiment, more than the nominal power is allocated to one beam during the time slots corresponding to retransmission of a packet. Then, in order to maintain the total conducted power into all N beams generated by an antenna fixture at the allowed limit, the total power allocated to the other beams must be reduced by the same amount. In another embodiment, the power allocated to the different beams is determined based on the received SINR on each beam. More power is allocated to the beams with smaller received SINR, and less power is allocated to the beams with larger received SINR. However, the total power allocated to all beams must be maintained below the specified limit. In other words, more power is allocated to the cell site beams corresponding to the aerial platforms that receive more interference.

Network Acquisition and Beam Tracking

There are two main phases during the communications between an aerial platform and the network of cell sites, initial network acquisition and subsequent aerial platform tracking. During the initial acquisition phase, the aerial platforms and the network of cell sites establish the initial communications links, and the aerial platforms register with the network. In one embodiment, the cell sites transmit a FL-BCH channel which begins with a known preamble. The aerial platforms search for the broadcast channel preamble signals from the cell sites, decode the FL-BCH messages, and read network information and configuration messages. In one variation of the embodiment, the aerial platform sequentially points, using mechanical or electronic beam steering, the boresight of its antenna beam toward different angular positions in 360° in azimuth, searches for the preamble of the FL-BCH messages transmitted by the cell sites, measures the signal quality of the detected FL-BCH messages from the cell sites, ranks the measured signal qualities at different aerial platform beam angular positions, and establishes a link between the cell site and aerial platform angular beam position from which it receives the strongest signal quality. Note that in the aforementioned acquisition embodiment, the aerial platform radio sub-system does not use any information regarding the position coordinates of the cell sites or those of the aerial platform in searching for FL-BCH frames. In another variation of the embodiment, the aerial platform radio sub-system uses a priori knowledge of the position coordinates of the cell site and those of the aerial platforms obtained from GPS/gyroscope sub-system 159 of the aerial platform radio sub-system (FIGS. 3A, 3B and 3C), to point the aerial platform's beam toward the position of the cell sites and searches for the FL-BCH messages sent by the cell sites. The configuration messages sent by the cell sites on the FL-BCH contains information on the RL-RACH on which the aerial platform may sent messages such as the registration and bandwidth request to the network.

Figure 5A:
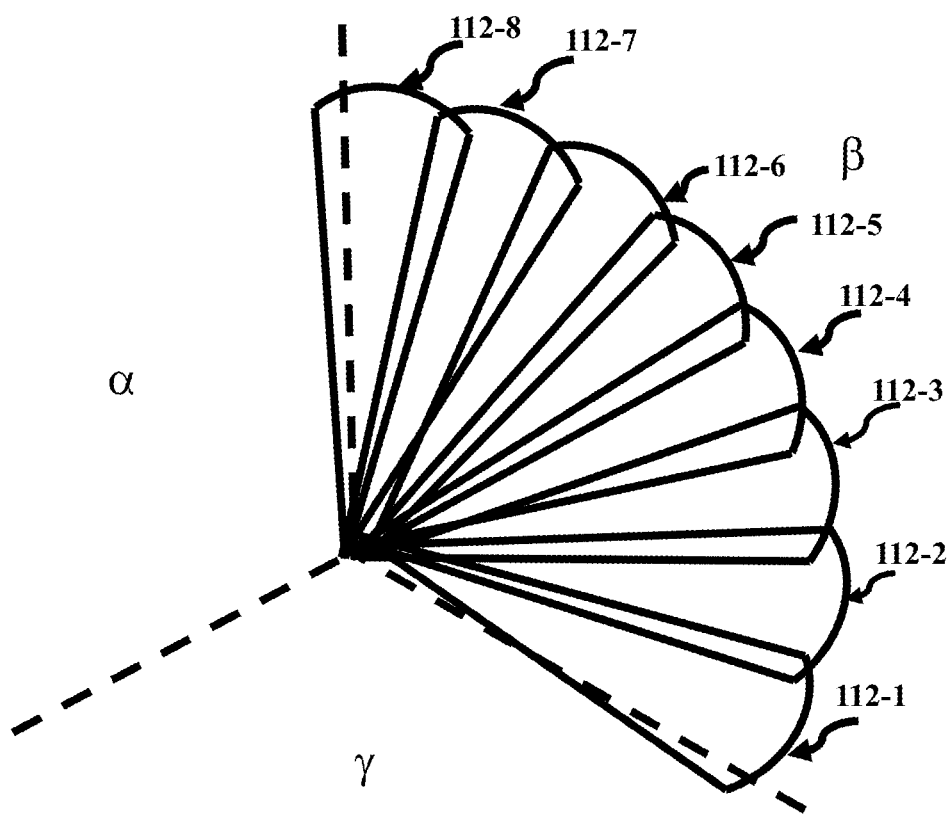
FIGS. 5A and 5B illustrate exemplary diagrams of sectorization and beam coverage, according to some embodiments.
Figure 5B:
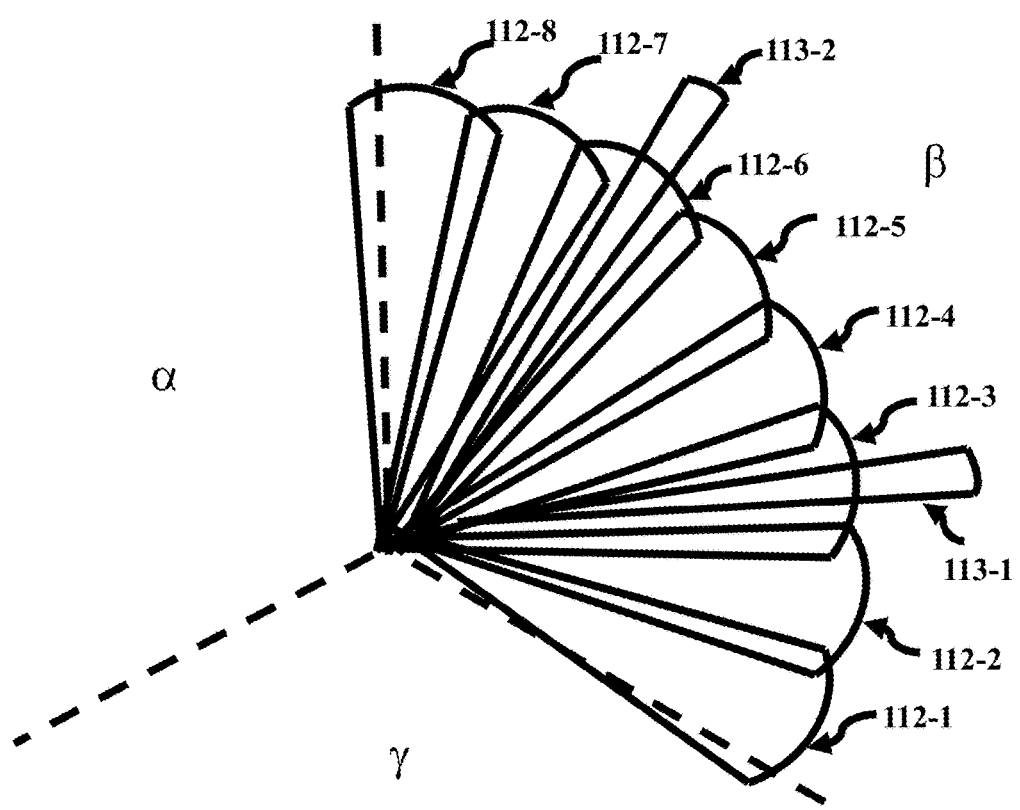

In one embodiment, sector coverage area of a cell site is further divided into a number of fixed sub-sectors and each sub-sector is covered by one cell site beam during the FL-BCH transmission, the beam covering the sub-sector referred to as the sub-sector-beam. In one exemplary cell site design shown in FIG. 5A, the cell site is divided into 3 sectors, and each sector is further divided into 8 sub-sectors. The three sectors in FIG. 5A are delineated by the dashed lines and are labeled by letters $\alpha$, $\beta$ and $\gamma$. Each of the 8 sub-sectors is covered by a beam labeled by 112-$j$, j an integer index identifying different instances of the same beam type. In FIG. 5A, only the sub-sector-beams of sector $\beta$ are shown. The sub-sector-beams of sectors $\alpha$ and $\gamma$ are similar to those of sector $\beta$. In this example, each sub-sector covers an azimuthal angular area of 15° because 8 sub-sectors cover one of each 3 sectors (360°/3/8=15°). Therefore, in this example the sub-sector-beam covering each sub-sector during FL-BCH transmission has beamwidth of 15°. In one embodiment, the sub-sector-beams 112-$j$ are fixed and have some overlap to ensure coverage is provided in all directions. In one embodiment, in order to reduce interference between adjacent sub-sector-beams, the available frequency channels are divided into two sets F1 and F2, a different set of frequency channels, F1 or F2 are assigned to adjacent sub-sectors for transmission of the FL-BCH and RL-RACH frames, referred to as frequency reuse of order 2. In frequency reuse of order 2, no two adjacent sub-sectors use the same frequency channel. In another embodiment, the sub-sectors are divided into two subsets, each subset comprising of non-adjacent sub-sectors, all frequency channels are used in all sub-sectors, two FL-BCH frames are provisioned in each super frame, during the first FL-BCH frame only the first subset of sub-sectors transmit and during the second FL-BCH only the second subset of sub-sectors transmit, thereby reducing interference in adjacent sub-sectors during transmission of FL-BCH frames. In one embodiment, in order to provide higher gain during the data transmission frames, the beam that is used to send data on the FL-DCH to the aerial platform or to receive data from the aerial platform on the RL-DCH have a narrower beamwidth than that of the sub-sector-beam used during the FL-BCH and RL-RACH transmissions. For instance, FIG. 5B shows two beams 113-1 and 113-2 that are narrower than the sub-sector-beams 112-$j$, and are used during the FL-DCH and RL-DCH frame transmissions.

If the forward link and return link frames of different sub-sectors of the same sector are not synchronized, then at a given time some sub-sectors will be transmitting while others are receiving, which in a TDD system will result in interference into the receivers. In one embodiment, in order to minimize interference between adjacent sub-sectors, the forward link and return link frames of adjacent sub-sectors are synchronized, and the cell site radio sub-system sends the FL-BCH frame simultaneously on all or a subset of the sub-sector-beams of the same sector. The FL-BCH of each sub-sector has a sub-sector specific preamble, and contains messages that have sector and sub-sector related information. The aerial platform sends its registration message on the RL-RACH channels corresponding to the same sub-sector on which it detects the FL-BCH messages. In one embodiment, the cell site uses the same sub-sector-beam to receive the RL-RACH frame as used during the FL-BCH frame. Then, the cell site radio sub-system detects the registration message sent by an aerial platform on the same sub-sector-beam that the corresponding FL-BCH is sent.

The example of cell sites comprising of 3 sectors, each sector comprising of 8 sub-sectors, and each sub-sector beam having beamwidth of 15° is used only for illustration purposes. A person of ordinary skill in the art will readily recognize that a number of sectors other than 3, a number of sub-sectors other than 8, and sub-sector-beams with beamwidth other than 15° may be used without departing from the scope of the disclosure.

In another embodiment for detecting the aerial platform's registration message, the cell site antenna sub-system forms narrow beams within the sector coverage area, and searches for signals sent by aerial platforms within each narrow return link beam. The cell site radio sub-system ranks the quality of the signals received from aerial platforms on the different narrow return link beams, and for each aerial platform chooses the narrow return link beam with strongest signal quality on which to demodulate and decode the messages received from the said aerial platform. The beam chosen during the acquisition phase is referred to as the current beam, and will be used for communications with the aerial platform during the aerial platform tracking phase which will be described later.

In another embodiment of the acquisition phase, the aerial platform points its antenna beam toward the cell sites, but instead of searching for the FL-BCH sent by the cell sites directly sends its registration message on the RL-RACH to the cell site to which it is pointing its beam; in this embodiment, the aerial platform radio sub-system needs a priori information regarding the RL-RACH parameters such as the frequency channel, time slot or the code that the different cell sites and their sub-sectors use to detect the RL-RACH messages. In one embodiment, a dedicated frequency channel is used by the cell sites on which to receive the RL-RACH. In one embodiment, the dedicated RL-RACH frequency channel may be divided into time slots and the aerial platforms send RL-RACH channel messages, such as the registration or bandwidth request messages, on the said RL-RACH frequency channel using Aloha protocol. In another embodiment, the dedicated RL-RACH frequency channel is shared by the aerial platforms in a spread spectrum multiple access fashion using predefined spreading codes. Each aerial platform uses a predefined code to encode its messages prior to transmitting the messages on the RL-RACH frequency channel. In another embodiment, instead of allocating a dedicated frequency channel or time slots to the RL-RACH channel, the aerial platforms transmit their random-access messages on a spread spectrum channel as an underlay to the data channels on the return link; in this embodiment, the aerial platforms encode their random-access messages using predefined spread spectrum codes, and transmit the resulting waveform on one of a number of frequency channels that are used for data transmission. The underlay spread spectrum random access channel may be sent at low data rate so that the RL-RACH messages create negligible interference to the dedicated data channel being sent on the same frequency channel.

Once the cell site radio sub-system receives a registration message on the RL-RACH from an aerial platform, it sends a registration acknowledgement message to the said aerial platform on the FL-BCH or the FL-DCH completing the registration process, and establishes a data-link between the cell site and an aerial platform. Then, the aerial platform is said to be associated with the cell site sub-sector on which the registration process is completed, and the corresponding sub-sector is referred to as the current active sub-sector for the aerial platform. The aerial platform continues monitoring the FL-BCH of the current sub-sector until the aerial platform moves into the coverage area of an adjacent sub-sector and is handed off to the adjacent sub-sector. During data transmission between an aerial platform and a cell site, the aerial platform is said to be in active mode.

If an aerial platform does not have data to transmit and the cell site also does not have data to send to the said aerial platform, then the aerial platform will enter idle mode. In the idle mode, the aerial platform points its beam toward the current sub-sector with which it is associated, and decodes the FL-BCH messages sent by the corresponding cell site sector. If cell site has data to send to an aerial platform in idle mode, the cell site will inform the aerial platform by sending a paging message to the aerial platform on the FL-BCH channel of the sub-sector with which the aerial platform is associated, and the aerial platform enters active mode following the reception of the paging message. Similarly, when an aerial platform in idle mode and has data to send to the cell site, the aerial platform sends a bandwidth request message on the RL-RACH of the current sub-sector with which the aerial platform is associated, the cell site sends a bandwidth grant message to the said aerial platform on the FL-BCH or FL-DCH channels, and the aerial platform enters active mode following reception of bandwidth grant messages from the cell site. In the idle mode, the aerial platform radio sub-system monitors the FL-BCH channel signal strength of the sub-sector adjacent to the current sub-sector, and if the signal strength of one of the adjacent sub-sectors is higher than that of the current sub-sector by a certain threshold, the aerial platform sends a handoff request message to the cell site on the current sub-sector requesting to be associated with the candidate handoff sub-sector with higher signal strength, the cell site sends a handoff grant message to the aerial platform on the current sub-sector, and upon reception of the handoff grant message the candidate handoff sub-sector will become the aerial platform's new current sub-sector.

Cell Site Beam Steering

The cell site beam that points toward the aerial platform during active data transmission mode is referred to as the data-beam. In order to provide higher gain toward the aerial platform, in some embodiments the beamwidth of the data-beam is chosen to be narrower than that of the sub-sector beam. For instance, FIG. 5B illustrates two data-beams 113-1 and 113-2 that are narrower than sub-sector-beams 112-$j$. In one embodiment for cell site data-beam design, the data-beam boresight can take one of a number fixed angular positions within a sub-sector, and the data-beam fixed angular beam position that provides the highest signal quality to the aerial platform receiver is chosen as the beam position at which the cell site points its beam toward the aerial platform, and is referred to as the current data-beam. In one embodiment for tracking the current data-beam to accurately point toward the aerial platforms, the cell site radio sub-system searches the return link of the aerial platform on the current data-beam as well as the two data-beam angular positions adjacent to the current data-beam angular position. If the signal quality on one of the adjacent data-beam angular positions is larger than that of the current data-beam, then the cell site radio sub-system designates the said adjacent data-beam angular position as the new current data-beam. In another embodiment, the cell site radio sub-system dithers the current data-beam in the predefined fixed angular values around the current data-beam angular position, measures the signal quality received on the dithered angular data-beam position, and chooses the angular position among the current data-beam position and the dithered data-beam position with the strongest signal quality as the new current data-beam angular position at which to point the cell site beam toward the aerial platform. In another embodiment of cell site beam tracking toward the aerial platform, the aerial platforms periodically transmit their position coordinates to the cell sites, and the cell sites point the boresight of their data-beams toward the latest position coordinates of the aerial platform.

Figure 6A:
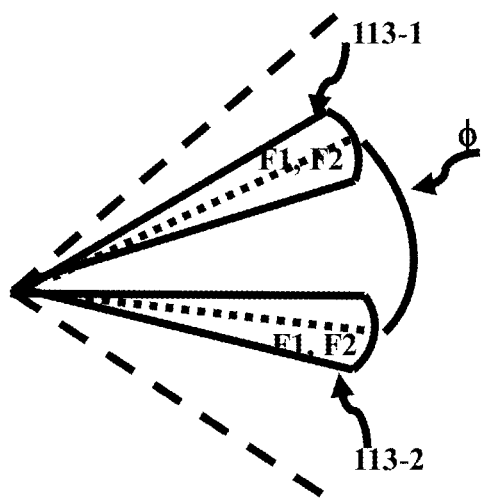
FIGS. 6A, 6B, 6C, and 6D illustrate exemplary diagrams of cell site beam positions and frequency reuse pattern, according to some embodiments.

In another cell site beam forming embodiment during the tracking phase, a cell site sector antenna sub-system continuously steers a data-beam toward each aerial platform within the coverage area of a given sector, referred to as continuous beam steering scheme, the beam angular position taking on any real value. In other words, within the coverage area of a sector antenna, the cell site sector antenna maintains a continuously steered data-beam toward each aerial platform and only hands off the aerial platform to another cell site sector when the said aerial platform moves outside the coverage area of the current sector with which it is communicating. The cell site sector antenna sub-system steers its data-beam toward an aerial platform such as to maintain the peak of the cell site data-beam toward the said aerial platform. FIG. 6A shows two data-beams (113-1 and 113-2) pointing toward two different aerial platforms. The angular beam spacing, $\varphi$, between two cell site beams, as shown in FIG. 6A, is the angle between the dotted lines from the cell site to the peaks of the two data-beams. The cell site radio sub-system assigns different frequency channels or antenna polarizations to cell sites data-beams whose angular spacing, $\varphi$, is less than a predefined threshold $\varphi_t$, and assigns all available frequency channels to data-beams whose angular spacing from all other data-beams is larger than the said threshold $\varphi_t$. In one embodiment, the threshold $\varphi_t$ is chosen such that for any data-beams spaced by larger than $\varphi_t$, the crossbeam interference between the two data-beams is smaller than a threshold resulting in a data rate above a threshold. When the two data-beams covering two aerial platforms are separated by more than $\varphi_t$, then the two data-beams may use all available spectrum, frequency channel sets F1 and F2 as marked inside each data-beam in FIGS. 6A and 6D.

Figure 6B:
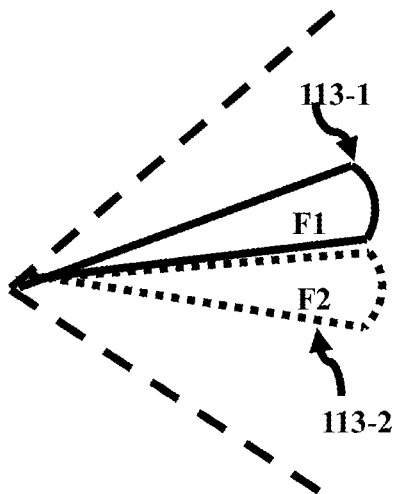
Figure 6C:
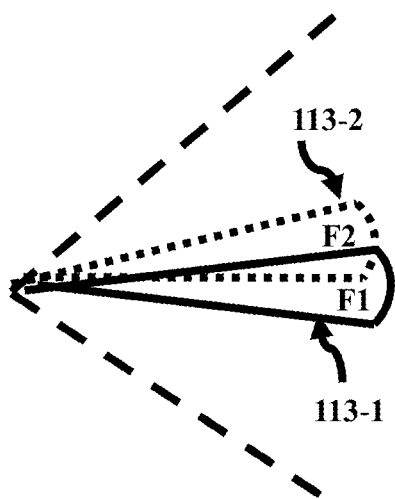
Figure 6D:
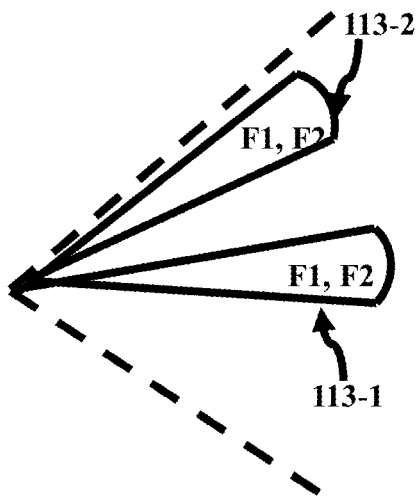

As two aerial platforms move in opposite directions, the angular spacing between the data-beams covering the two aerial platforms becomes less than $\varphi_t$, which causes excessive crossbeam interference for the co-frequency channels, at which time each aerial platform is assigned a different set of frequency channels in order to avoid crossbeam interference at the receivers of the two aerial platforms, as shown in FIGS. 6B and 6C where data-beams 113-1 and 113-2 are assigned separate frequency channel sets F1 and F2. In FIGS. 6A to 6D, it is assumed that the aerial platform of data-beam 113-1 is moving in a clockwise direction relative to the cell site, and the aerial platform being covered by data-beam 113-2 is moving in a counter-clockwise direction. Then, as shown in FIG. 6C, at some point data-beams 113-2 and 113-1 move past each other, and each data-beam is served by a different frequency channel set, or a different set of time slots on the same frequency channel, until the angular spacing of the two data-beams becomes larger than the threshold $\varphi_t$, as shown in FIG. 6D where both data-beams may use all available frequency channel sets and all time slots while maintaining the crossbeam interference on the co-frequency channels below a predefined value. In FIGS. 6B and 6C, the two beams 113-1 and 113-2 that use different sets of frequency channels are shown by solid and dotted triangular shapes to emphasize the use of different sets of frequency channels by the two data-beams. In FIGS. 6A and 6D, the two beams 113-1 and 113-2 that use the same sets of frequency channels are both shown by solid triangular shapes. When assessing the angular spacing of data-beams adjacent to a data-beam in determining the frequency channel, time slots, and antenna polarization assignment for each data-beam, beams in adjacent sectors need also be considered to ensure that no two data-beams of the cell site whose angular spacing is less than the $\varphi_t$ would be assigned the same frequency channel, time slot, and antenna polarization.

The cell site radio sub-system may speed up the beam tracking process by using the aerial platform heading information provided by the aerial platform, or by predicting the aerial platform heading by applying predictive filtering to the recent cell site beam adjustments. Knowledge of the aerial platform heading will allow search of the candidate beam positions only in the angular direction of movement of the aerial platform, thereby reducing the search time. When the aerial platform antenna beam is steered toward the cell site using mechanical steering mechanism, steering errors may accumulate due to the imperfections and artifacts of the mechanical parts such as the motor backlash. These errors may be mitigated by also using forward link signal quality measurements at the aerial platform. The aerial platform radio and antenna sub-systems dither the aerial platform antenna beam in at least one candidate beam position around the current aerial platform beam position, measure the received signal quality at the current beam position as well as at the dithered candidate beam positions, and choose the beam position with highest signal quality for the new aerial platform current beam position.

Cell Site Coverage Design

Figure 7A:
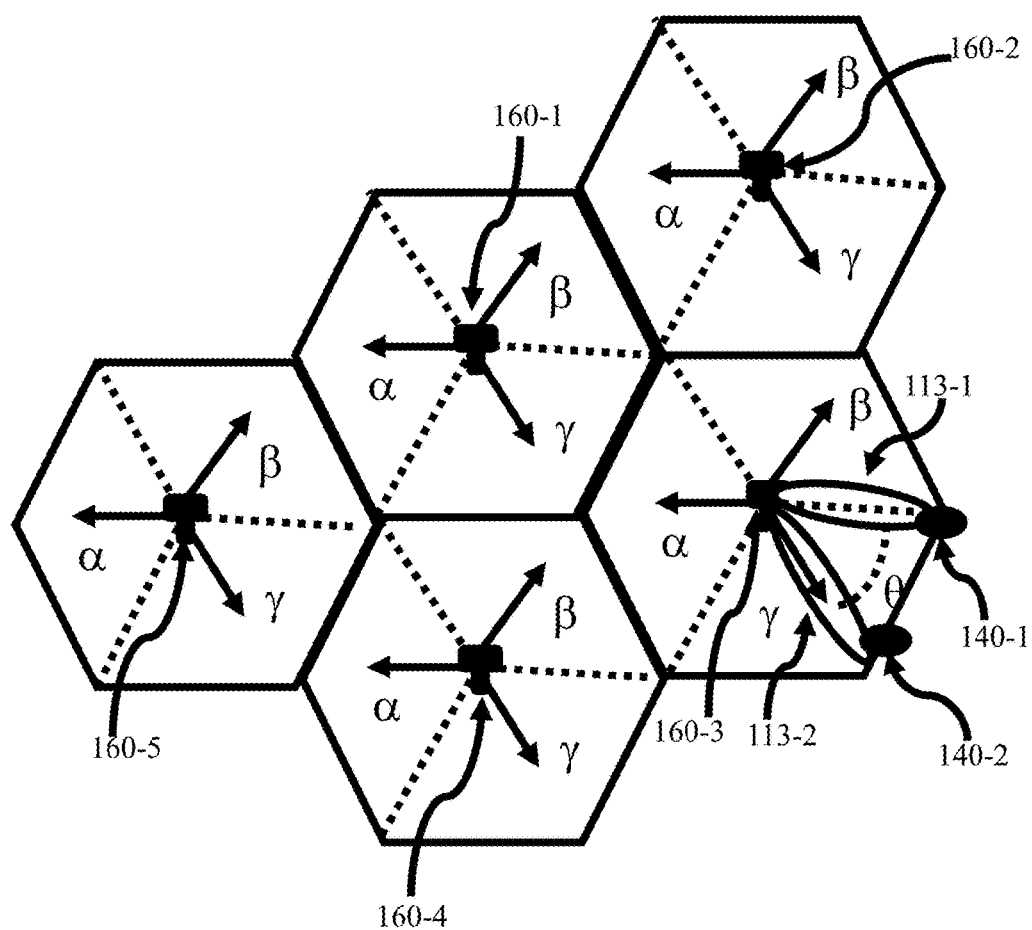
FIGS. 7A, 7A and 7C illustrate exemplary diagrams of cell site sectorization, according to some embodiments.

The cell site design scheme shown in FIG. 7A, divides the coverage area into conceptually hexagonal shapes, the cell site equipment is placed at the center of each hexagonally shaped cell site, and each hexagonal coverage area is divided into a number of sectors delineated by the dotted lines, 3 sectors in the example of FIG. 7A and labeled by $\alpha$, $\beta$ and $\gamma$. Each of the three arrows emanating from the cell site equipment 160 illustrate the direction toward which the antenna aperture of each sector is pointing. Note that the conceptual hexagonal shapes are chosen to approximate the coverage area of each cell site. The actual antenna patterns covering each sector overlap with adjacent sectors. Hexagonal shapes are a guideline for the design of antenna patterns and optimizing the coverage areas. The vertical spacing of cell sites cell design of FIG. 7A is $\sqrt{3}a$, where a is side of the hexagons; the horizontal spacing of cell sites is 3a.

Figure 7B:
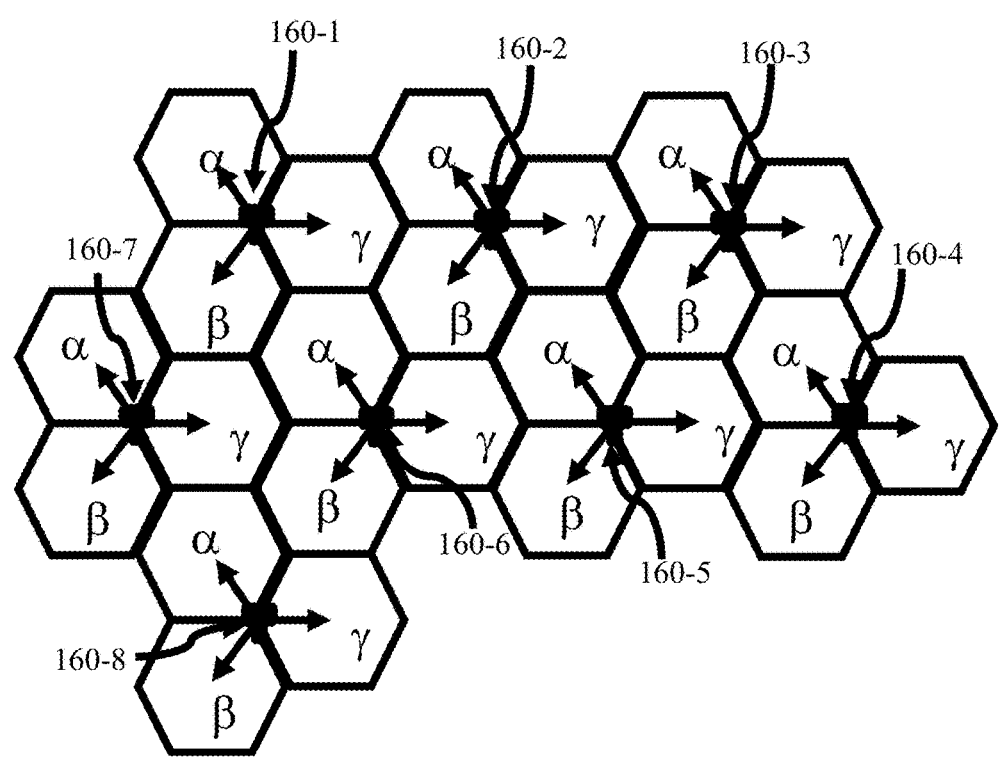

In the cell site design scheme of FIG. 7B, the coverage area is similarly divided into conceptually hexagonal shapes, but in FIG. 7B each hexagonal area corresponds to one sector coverage area. FIG. 7B shows eight cell sites, where each cell site comprises of three hexagonally shaped sectors, the three sectors are also labeled by $\alpha$, $\beta$ and $\gamma$. A cell site equipment 160-$j$, where j is an integer index identifying different instances of the same cell site equipment type, placed at the corner of 3 sectors comprising each cell site. The cell site equipment 160 comprises of at least three antenna sub-systems, and each of the three sectors $\alpha$, $\beta$ and $\gamma$ is covered by a different antenna sub-system/aperture. Each of the arrows emanating from the cell site equipment 160-$j$ illustrates the direction toward which the antenna aperture of each sector is pointing, which is nominally toward the center of the sector. The vertical spacing between cell sites of cell design of FIG. 7B is $3\sqrt{3}a$, where a is side of the hexagons; the horizontal spacing is 3a.

Figure 7C:
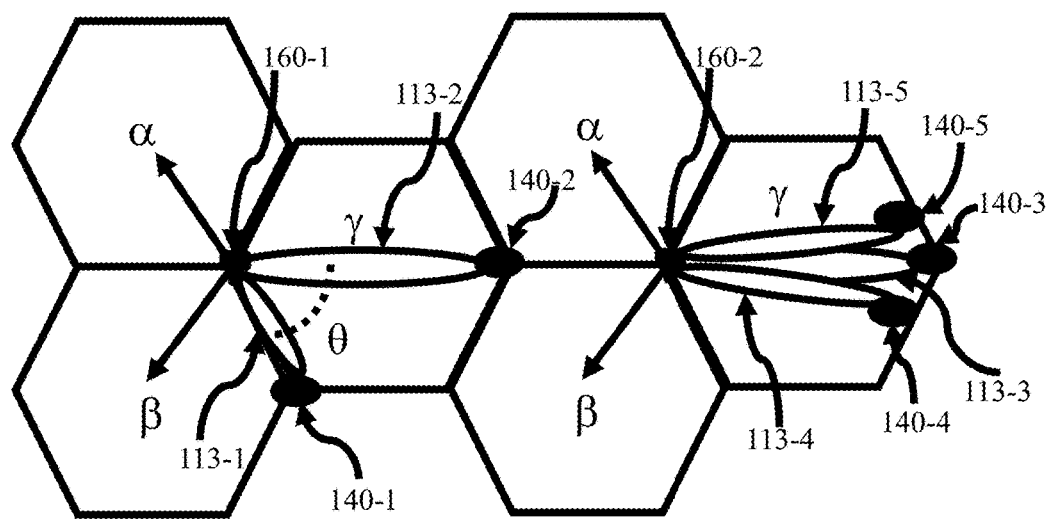

In one embodiment, the antenna panel installed in each sector comprises of a number of rows and columns of antenna elements as illustrated in FIG. 2A. The antenna elements are phased to point the beam in different azimuthal or elevation angular positions. Due to the so-called scan loss effect, the beams that point toward the edge of the sector (beam 113-1 in FIG. 7C) have a lower gain than the beams that point toward the center of the sector (beam 113-2 in FIG. 7C). The scan loss is approximately given by $(\cos(\theta))^{1.5}$, where $\theta$ is the angle of boresight of the beam relative to the center of the sector as shown in FIG. 7C for beam 113-1. Scan loss is approximately 4.51 dB at 60° from the center of the sector, respectively. Similarly, for the cell site design of FIG. 7A where each sector is 120° wide in azimuth, the antenna gain at aerial platform 140-1 is about 4.51 dB lower than that for the aerial platform 140-2 because $\theta=60°$ in this case also. But the path loss from the cell site to the two aerial platforms 140-1 and 140-2 of FIG. 7A is the same due to the same distance. Then, the received power at aerial platform 140-1 of FIG. 7A will be about 4.51 dB less than that of aerial platform 140-2. In the exemplary cell design of FIG. 7C, the reduced path loss near the corner of the sector vs that of the center of the sector compensates for the reduced antenna gain at large azimuthal angles from center of the sector. For instance, the aerial platform 140-1 (FIG. 7C) at the lower corner of sector γ is at half the distance from the center of the cell site versus aerial platform 140-2 which is at the far corner of sector γ. The path loss for aerial platform 140-1 is 6 dB lower than that of 140-2. Then, the received signal power at aerial platform 140-1 will be about 1.49 dB higher than that of 140-2. The difference between the received signal powers at different locations around the perimeter of the sector in the sectorization design of FIG. 7C is less than that of the cell design of FIG. 7A. In other words, scan loss has a smaller impact in the sectorization scheme of FIG. 7C than that of FIG. 7A.

In one embodiment, the signal power received at the different aerial platforms is equalized by allocating different amounts of power to the beams corresponding to the different aerial platforms while maintaining the total conducted power below the regulatory limit. In another embodiment, the received SINR at the different aerial platforms is equalized by allocating different amounts of power to the beams corresponding to different aerial platforms, subject to a total conducted power into the antenna aperture.

Network Frequency Reuse Pattern Considerations

An important cellular network optimization consideration is how the available frequency channels are divided into a number of subsets, and the frequency subsets are assigned to the different cell site sectors and beams, referred to as frequency reuse pattern. For example, in one simple frequency reuse pattern, the available frequency channels are divided into two sets F1 and F2, and adjacent beams in each cell site use a different set of frequency channels, referred to as Frequency Reuse Order of 2 (FRO2). FRO1 refers to frequency reuse order of 1 where all frequency channels are used in each beam. Let $SINR_{FRo1}$ and $SINR_{FRo2}$ be the achieved SINR at the receiver for FRO1 and FRO2 for the case of a network comprising of two beams, and bps/Hz be the bandwidth efficiency defined as the achieved bits per second per Hz of spectrum. Since in FRO2 the available spectrum in each beam is halved, then the bps/Hz at $SINR_{FRO2}$ must be at least double the bps/Hz of $SINR_{FRO1}$, for FRO2 to outperform FRO1.

An estimate of bandwidth efficiency at a given SINR may be obtained using Shannon bound, by including a coding and implementation loss of $\Delta$ dB in the equation. Then, an estimate of bandwidth efficiency is given by $$\text{Log}_2\left(1 + 10^{\frac{(SINR-\Delta)}{10}}\right), \tag{7a}$$

where SINR is given in dB scale. Note that since in FRO2 the available power is spread over half the spectrum versus that of FRO1, then SINR for FRO2 is at least 3 dB higher than that of FRO1 due to the 3 dB higher received signal power. An implementation and coding loss of $\Delta=3$ dB is close to what a well-designed and well implemented modem should achieve.

If antenna beams of cell sites and aerial platforms have narrow beamwidth in azimuth, then the number of cell site beams that cause interference to an aerial platform is limited to a small number, as low as 4 or less, for example when aerial platform beam has bandwidth of ~15° and the cell sites have beamwidth of a few degrees. As an example, the aerial platform 140-3 (FIG. 7C) which is pointing its beam toward cell site equipment 160-2 receives interference mostly from 3 beams, namely beams 113-2, 113-4 and 113-5 which are pointed toward aerial platforms 140-2, 140-4 and 140-5. The total throughput of the network may be higher when a frequency reuse pattern with order greater than 1 is applied to the set of beams that have crossbeam interference levels above a certain threshold. In the example of FIG. 7C, frequency reuse patterns with orders of 1, 2, 3 and 4 may be used for the four beams 113-2, 113-3, 113-4 and 113-5, where frequency reuse pattern with order of 1 scheme divides the available frequency channels into 1 sets and assigns each set to one or more of the beams. In the example of FIG. 7C where there are 4 beams with crossbeam interference, the frequency reuse pattern that maximizes the throughput is not necessarily frequency reuse pattern of order of 4. Each of the candidate frequency reuse patterns with different orders is evaluated, and the one with highest performance is chosen.

Let L be the number of beams with crossbeam interference above a specified threshold, for which different frequency reuse patterns need to be evaluated to find the frequency reuse pattern that maximizes a certain network performance metric. A given frequency reuse pattern over the L beams comprises of dividing the L beams into one or more subsets referred to as beam-subsets, dividing the available frequency channels into one or more subsets referred to frequency-channel-subsets, and assigning the frequency-channel-subsets to the beam-subsets whereby each beam-subset may be assigned multiple frequency-channel-subsets. Let FRP(q) denote the q-th Frequency Reuse Pattern, q an integer index identifying different frequency reuse patterns, and $f_l(q)$ be the fraction of the frequency channels assigned to the l-th beam in the frequency reuse pattern FRP(q). Note that in a given frequency reuse pattern some beams may be assigned more frequency channels than other beams, and $f_l(q)$ is different for different beams l. The total bandwidth efficiency summed over all L beams for the frequency reuse pattern FRP(q) may be estimated, using the aforementioned Shannon bound, as $$\sum_{l=1}^{L} f_l(q) \times \text{Log}_2\left(1 + 10^{\frac{(SINR^l_{FRP(q)}-\Delta)}{10}}\right), \tag{7b}$$

where $SINR_{FRP(q)}^l$ is the received SINR at the aerial platform assigned to the l-th beam under FRP(q).

In one embodiment, the received signal power, and the received interference powers at the aerial platform from the interfering cell sites are measured, the $SINR_{FRP(q)}^l$ are estimated based on the measured values, and (7b) is evaluated for the estimated $SINR_{FRP(q)}^l$ values, and the resulting bandwidth efficiency values are compared to determine the frequency reuse pattern with the highest bandwidth efficiency. In another embodiment, the received signal power, and the received interference from the interfering cell sites are computed using the position coordinates and beam patterns of the aerial platforms and the cell sites, and then the $SINR_{FRP(q)}^l$ values are computed based on the computed signal and interference powers, and (7b) is evaluated for the computed $SINR_{FRP(q)}^l$ values. In another embodiment, a table of achievable data rate versus SINR is generated using simulations or measurements, $SINR_{FRP(q)}^l$ are estimated per previous embodiments, the achievable data rates for all aerial platforms l=1, . . . , L. are obtained from the aforementioned table for the estimated $SINR_{FRP(q)}^l$, and the total throughput on all L beams is computed and the frequency reuse pattern with highest total throughput is chosen.

Equation (7b) may be used to study specific beam configurations to devise general frequency reuse guidelines. As an example, in the case of only 2 adjacent beams, if received SNR (Signal to thermal Noise power Ratio) at the aerial platform is >10 dB, then evaluation of (7b) indicates that frequency reuse order of 2 should be used if boresights of adjacent cell site beams covering the two aerial platforms are apart by less than the beam's beamwidth.

Cell Site to Aerial Platform Assignment

In the forthcoming discussion, systems and methods are described for assigning aerial platforms to cell sites, and specifying an accompanying frequency reuse pattern, such as to optimize certain network performance metrics. The following terminology is defined to facilitate the discussion.

Definitions a. $N_c$—number of cell sites in the network;
b. $N_b$—number of beams in a cell site;
c. $N_a$—number of aerial platforms in active mode in the network;
d. different cell sites, aerial platforms, and cell site beams are, respectively, identified by integer indices i, j and k, where $1 \le i \le N_c$, $1 \le j \le N_a$, and $1 \le k \le N_b$;
e. AS—set of aerial platforms in active mode;
f. FRP(q)—the q-th network Frequency Reuse Pattern (FRP) that specifies the frequency channels assigned to each aerial platform to cell site link in the network, where q is an integer index identifying different frequency reuse patterns;
g. APCS({(i,j)}, FRP(q))—is an Aerial Platform to Cell Site beam assignment set where each of the $N_a$ aerial platforms are associated with a pair (i,j), one for each aerial platform, the pair (i,j) indicates aerial platform j is assigned to cell site i, and FRP(q) is the frequency reuse pattern with index q associated with the set {(i,j)} that specifies the frequency channels assigned to each link (i,j) in the set {(i,j)};
h. $P_{ijk}$—transmit power from the k-th beam at the i-th cell site to the j-th aerial platform;
i. $P_{aj}$—transmit power of the j-th aerial platform;
j. $W_{ij}N_o$—thermal noise power in the frequency channel between aerial platform j and cell site i, where $W_{ij}$ is the corresponding frequency channel bandwidth and $N_o$ is thermal noise power spectral density;
k. $SINR_{FRP(q)}^l$—SINR received at aerial platform j for frequency reuse pattern FRP(q);
l. $L_{ij}$—propagation path loss from cell site i to aerial platform j;
m. $B_{ijk,j'}$—antenna gain of the k-th beam of i-th cell site toward aerial platform j', when cell site i is pointing its k-th beam toward, and is communicating with, aerial platform j;
n. $A_{ij,i'}$—antenna gain of the j-th aerial platform toward cell site i', when aerial platform j is pointing the boresight of its beam toward, and is communicating with, cell site i;
o. (FCH((i,j),FRP(q))≡FCH((i_o,j_o),FRP(q))) means the aerial platform j to cell site i link is also assigned the Frequency CHannels (FCH) that are assigned to the aerial platform $j_o$ to cell site $i_o$ link, corresponding to frequency reuse pattern FRP(q);
p. CS(j)—set of cell sites from which the j-th aerial platform receives adequate signal power to establish a communications link with a specified minimum data rate;
q. $I_{ij,Ext}$—external interference, from exogenous users other than the cell sites under consideration, received on a given frequency channel at the receiver of aerial platform j that is pointing its beam toward cell site i;
r. $I_{ik,Ext}$—external interference, from exogenous users of the frequency band other than the aerial platforms under consideration, received on a given frequency channel at the receiver of k-th beam of cell site i.

In one embodiment, an aerial platform j may estimate $I_{ij,Ext}$ by decoding the preamble sent by cell site i on the FL-BCH frame of the sub-sector-beam with which the aerial platform is associated, estimating the total received power and the received preamble signal power, and subtracting the preamble signal power and the ambient noise floor power from the total received power. The estimated external interference power is filtered over a number of measurement samples and then sent to the network control entity, along with the position location coordinates and orientation of the aerial platform antenna beam, to be stored for later SINR calculations. The external interference may similarly be estimated from the FL-DCH channel. If the external interference is excessively high, then the aerial platform receiver may not be able to decode the preamble on FL-BCH, in which case in one embodiment the $I_{ij,Ext}$ is estimated by measuring the total received power on the frequency channel. In one embodiment, cell site i may estimate $I_{ik,Ext}$ by decoding the preamble sent by an aerial platform on the RL-RACH frame of the sub-sector-beam with which the aerial platform is associated, estimating the total received power and the received preamble signal power, and subtracting the preamble signal power and the ambient noise floor power from the total received power. The estimated external interference power is filtered over a number of measurement samples and sent to the network control entity, along with the direction of cell beam over which the exogenous interference is estimated, to be stored for later SINR calculations. The external interference may similarly be estimated from the RL-DCH channel. If the external interference is excessively high, then the cell site receiver may not be able to decode the signal on RL-RACH or RL-DCH, in which case in one embodiment the $I_{ik,Ext}$ is estimated by measuring the total received power on the frequency channel.

In another embodiment for exogenous interference measurement, cell sites do not transmit during certain time slots allocated for measuring exogenous interference, referred to as interference measurement time slots. Aerial platforms point their antenna beams in different directions, estimate total received power in each direction during the interference measurement time slots, and subtract the thermal noise power from the total received power to estimate the exogenous interference power. Aerial platforms send the estimated exogenous interference power along with the aerial platform position coordinates and the aerial platform antenna beam orientation to the network control entity. Certain time slots are similarly allocated on the reverse link for measuring reverse link exogenous interference power during which no aerial platform transmits. Cell sites measure reverse link exogenous interference power during the reverse link interference measurement time slots, and send the measured interference powers, along with the cell site beam orientation, to the network control entity.

Figure 8A:
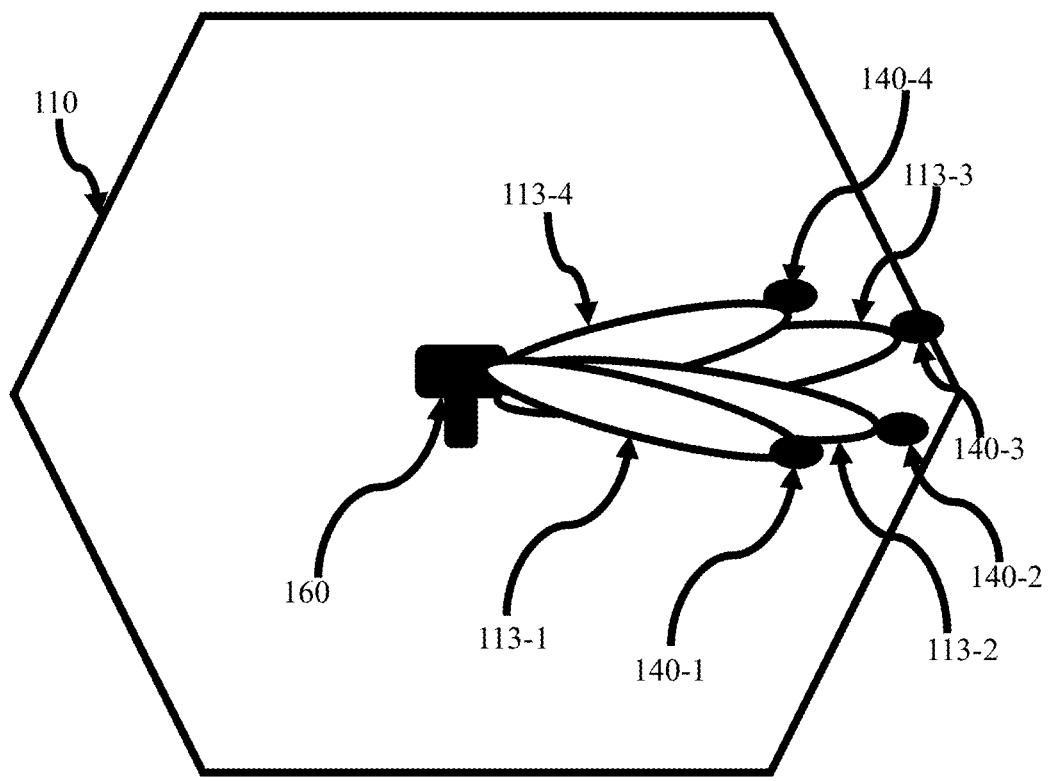
FIGS. 8A and 8B illustrate exemplary diagrams of cell site beam assignment to aerial platforms, according to some embodiments.
Figure 8B:
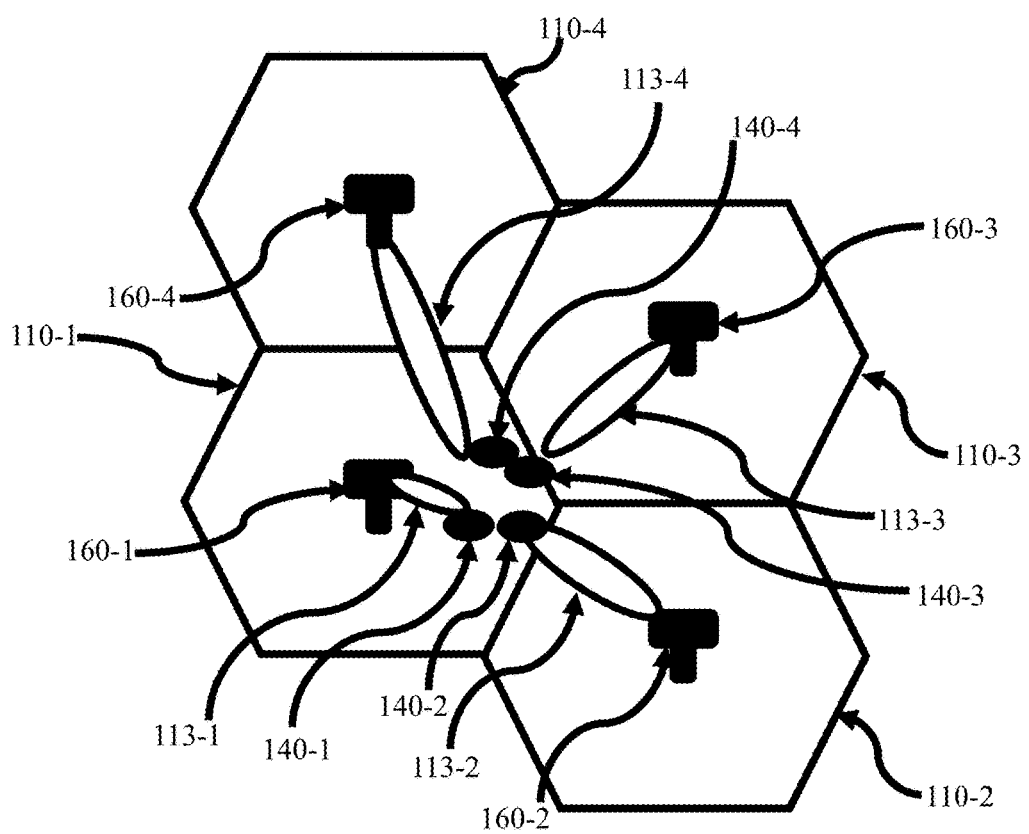

Herein, the word assignment is used as a short form for the aerial platform to cell site beam assignment and its associated frequency reuse pattern, APCS({(i,j)},FRP(q)), defined previously. In one assignment embodiment, frequency reuse order of 1 is assumed and aerial platform j is assigned to the cell site i from which it receives the strongest signal strength. This cell site beam assignment method may result in assigning a large number of aerial platforms to one cell site when there are a large number of aerial platforms in proximity of a given cell site. Assigning a large number of aerial platforms to one cell site will result in low data rates to aerial platforms and low usage of the network resources. For instance, commercial and general aviation aircraft tend to travel in certain corridors. In other words, the air traffic density for aircraft may not be uniformly distributed in 360 degrees in a given cell site. Then, a beam assignment whereby each aircraft is assigned to the cell site to which it is closest, or from which it receives the highest signal power, may result in assigning many aircraft to the same cell site sector and to cell site beams that would overlap significantly. The overlapped cell site beams create crossbeam interference. The crossbeam interference increases interference to the receiver of each aerial platform thereby reducing the SINR that each aerial platform receives, resulting in inefficient use of the spectrum and low data rates to the aircraft communicating using the overlapped beams. FIG. 8A, illustrates a scenario where four aerial platforms 140-1, 140-2, 140-3 and 140-4 are inside a cell site coverage area 110, and communicate with cell site equipment 160 using the four cell site beams 113-1, 113-2, 113-3 and 113-4, respectively. In the example of FIG. 8A, each aerial platform communicates with the cell site that is closest to the aerial platform. As can be seen, the four beams in FIG. 8A overlap significantly which will result in large crossbeam interference, thereby reducing the received SINR, and reducing the corresponding data rate at each aerial platform receiver subsystem. FIG. 8B illustrates a cell site assignment assuming frequency reuse order of 1 where the four aerial platforms are assigned to cell sites such as to minimize crossbeam interference between the beams from aerial platforms to their assigned cell sites. As can be seen in FIG. 8B, under the crossbeam minimization criterion three of the aerial platforms are assigned to other farther cell sites. Network performance metrics and systems and methods are needed for assignment of aerial platforms to cell sites and devising a frequency reuse pattern for the assignment, such as to optimize the specified network performance metrics.

The NC (Network Controller 180 in FIGS. 2A and 2B) generates a set AS of all aerial platforms that are in active mode, or are transitioning into active mode, and must be assigned to a cell site. For each aerial platform j in the set AS, NC determines the set of cell sites, defined above as CS(j), from which the aerial platform will receive adequate signal strength, or adequate SNR (received Signal power to Noise power Ratio), to achieve a certain minimum data rate in absence of any interference from other beams. In other words, the set CS(j) contains indices of all cell sites which are potential candidates to be assigned to the j-th aerial platform. As will be described in the forthcoming embodiments, APCS({(0)},FRP(q)) is generated in such a way as to optimize a certain performance criterion. For each aerial platform j and cell site i pair in the set APCS({(i,j)},FRP(q)), the NC estimates received $SINR_{FRP(q)}^{j_o}$ at the $j_o$-th aerial platform according to $$SINR_{FRP(q)}^{j_o} = \frac{P_{i_o j_o k_o} B_{i_o j_o k_o, j_o} A_{i_o j_o, j_o} L_{i_o j_o}}{\sum_{i,j,k, j \neq j_o, (FCH((i,j),FRP(q)) \equiv FCH((i_o,j_o),FRP(q)))} P_{ijk} B_{ijk, j_o} A_{i_o j_o, i} L_{ij} + I_{i_o j_o, Ext} + W_{i_o j_o} N_o} \qquad (8)$$

where $i_o$ and $k_o$ are the indices of the cell site and the beam with which aerial platform $j_o$ is communicating. The numerator of equation (8) is the received desired signal power at the aerial platform, and the denominator of (8) is the sum of all interfering beam received powers plus the thermal noise floor power $W_{ij} N_o$. The (FCH((i,j),FRP(q))≡FCH((i_o,j_o),FRP(q))) restriction in the summation in (8) ensures that only the interference from interfering beams using the same frequency channel as the aerial platform under consideration is included in the total interference. The computed SINRs from equation (8) are used to estimate the achievable data rate at each aerial platform, and compute a network performance metric that is a function of the data rates received by the aerial platforms, to find the optimal assignment and its associated frequency reuse pattern.

Let DR(i,j) denote the data rate on the cell site i to aerial platform j link, and {DR(i,j)} denote the set of all data rates in the network. In one embodiment, the network performance optimization metric for a given aerial platform to cell site assignment, and its associated frequency reuse pattern, is a certain function, f({DR(i,j)}), of data rates received at the aerial platforms. In one embodiment, the data rates, DR(i,j), are estimated using the Shannon bound approach, by multiplying the result of equation (7a) for the estimated SINRs from equation (8) by the frequency channel bandwidth $W_{ij}$. One network performance metric is the total network throughput defined as the sum of data rates from cell sites to the aerial platforms. Another network throughput criterion is the sum of the network throughput on forward link over all links, as well as overall reverse links. A network performance optimization scheme which only maximizes the network throughout may result in an assignment APCS({(i,j)}, FRP(q)) which results in a large variation between data rates received at the different aerial platforms. An optimization metric which maximizes the network throughput subject to a constraint on a minimum data rate at each aerial platform, and a minimum data rate on at each cell site receiver, would result in an assignment that is fair in the sense of reducing variation in data rates to different aerial platforms. Note that the aerial platform to cell site assignment determination may be carried out offline, and once the process of the assignment determination is completed, then the aerial platforms will be informed of their assignments via messages sent in the FL-BCH frames.

In one embodiment, the first aerial platform j is assigned to a cell site i from which it receives the highest SINR, where SINR is computed using equation (8) while accounting for the external interference term $I_{ij,Ext}$. Note that since the external interference, $I_{ij,Ext}$, is explicitly included in the SINR computation in equation (8), then the assignment algorithm will automatically exclude cell sites from whose direction the aerial platform will receive excessive external interference, thereby avoiding external interference. In one embodiment, the NC stores measured $I_{ij,Ext}$ values and the position location coordinates of the aerial platform where the measurement is made, and looks up the stored values when calculating (8). As will be described below, in some embodiments assignment of aerial platforms will be optimized using SINR measurements at the aerial platform. An iterative procedure for optimizing the aerial platform to cell site assignment and associated frequency reuse pattern, and adding a new active mode aerial platform to the network, is carried out according to the following 2 steps.

1. Let APCS ($\{(i,j)\}$, FRP(q)) be the latest aerial platform to cell site assignment, referred to as the current assignment. In this step, an assignment optimality test is iteratively carried out for each aerial platform, one at a time, whereby a new assignment is tested by reassigning an aerial platform, and if the new assignment has higher network performance it replaces the current assignment. Let $j_{test}$ denote the index of the aerial platform which is being reassigned. $j_{test}$ is chosen from the list of all active aerial platforms in some sequence, such as round robin, as long as all aerial platforms are tested at least once during a certain time interval. Aerial platform $j_{test}$ is reassigned to find a new assignment with higher network performance metric as described next. Let Z be the number of cell sites in the set $CS(j_{test})$, and $i_z$ denote the index of the cell sites in the set $CS(j_{test})$, $1<z<Z$. Generate Z temporary assignments as follows: for each cell site $i_z$ in the set $CS(j_{test})$, generate a temporary assignment temp$\{\{(i,j), j \neq j_{test}\}, (i_z, j_{test})\}$ that contains the assignments from the current assignment for all aerial platforms $j \neq j_{test}$ and a new link from aerial platform $j_{test}$ to cell site $i_z$, compute the aerial platform data rates (using SINR estimates from equation (8)) and the corresponding network performance metric function value for the set temp$\{\{(i,j), j \neq j_{test}\}, (i_z, j_{test})\}$ and all possible frequency reuse patterns for the set temp$\{\{(i,j), j \neq j_{test}\}, (i_z, j_{test})\}$, generate a new assignment by associating the frequency reuse pattern with the highest computed performance metric value with assignment temp$\{\{(i,j), j \neq j_{test}\}, (i_z, j_{test})\}$ and save the assignment and its corresponding performance metric value. From among the Z saved temporary assignments temp$\{\{(i,j), j \neq j_{test}\}, (i_z, j_{test})\}$ and their associated frequency reuse patterns, choose the one with the highest computed network performance metric value to be the candidate replacement assignment. If the performance of the candidate replacement assignment is higher than that of the current assignment, then the candidate assignment will replace the current assignment. If a new aerial platform is transitioning into active mode then go to step 2, otherwise repeat step 1.

2. Let APCS($\{(i,j)\}$, FRP(q)) be the latest current assignment, and $j_{new}$ denote the index of the new aerial platform. Let Z be the number of cell sites in the set $CS(j_{new})$, and $i_z$ denote the index of the cell sites in the set $CS(j_{new})$, $1<z<Z$. Generate Z temporary assignments as follows: for each cell site $i_z$ in the set $CS(j_{new})$, generate a temporary assignment temp$\{\{(i,j)\}, (i_z, j_{new})\}$ that contains the assignments from the latest assignment and a new link from aerial platform $j_{new}$ to cell site $i_z$, compute the aerial platform data rates (using SINR estimates from equation (8)) and the corresponding network performance metric function value for the set temp$\{\{(i,j)\}, (i_z, j_{new})\}$ and for all possible frequency reuse patterns for the set temp$\{\{(i,j)\}, (i_z, j_{new})\}$, generate a new assignment by associating the frequency reuse pattern with the highest computed performance metric value with assignment temp$\{\{(i,j)\}, (i_z, j_{new})\}$ and save the assignment and its corresponding performance metric value. From among the Z saved temporary assignments temp$\{\{(i,j)\}, (i_z, j_{new})\}$ and their associated frequency reuse pattern, choose the one with the highest computed network performance metric as the new current assignment. If there is no new aerial platform to be added go to step 1, otherwise repeat step 2.

As mentioned previously, when the aerial platform and cell site antenna beams have narrow beamwidths, then a small number of cell site beams interfere with the new aerial platform being added or with the aerial platform which is being reassigned. Then, when determining the optimal frequency reuse pattern at an iteration, the frequency reuse order for the beams whose crossbeam interference change by more than a certain threshold after the addition or reassignment of an aerial platform need to be optimized. In one embodiment, the optimal frequency reuse pattern is obtained by creating a list of different frequency reuse patterns for a subset of the beams whose crossbeam interference change by more than a certain threshold after the addition or reassignment of an aerial platform, and evaluating the performance metric value of the frequency reuse patterns in the said list to determine the frequency reuse pattern with the highest performance metric value. In other words, the frequency reuse pattern optimization may be carried out in a localized manner by focusing on a subset of the beams that are affected by the new addition, thereby reducing the optimization computation time.

As aerial platforms move, the cell site to aerial platform assignment may no longer be optimal. Therefore, the assignment needs to be periodically recomputed according to the same procedures described above. As an example, if the cell site beam beamwidth is 3° and an aircraft is at a distance of 100 km from the cell site, then the distance covered by the beam's beamwidth is about 5 km around the aircraft. Suppose the two aircraft are traveling parallel to the same sell site and in opposite directions as in FIG. 6A, and at a given time the peak of the cell site beams covering the two aircraft is 4° apart, for which the crossbeam interference is small and the two beams use the same frequency channel without excessive crossbeam interference. In this case, in about 3 seconds the peaks of the two cell site beams tracking the aircraft travelling in opposite directions and parallel to a cell site, at distance of 100 km from the cell site, and at speed of 1000 km/hour become 3° apart. When the spacing between the peaks of the two beams goes below the beams' beamwidth, then frequency reuse order of 2 may have higher performance. Step 1 of the above assignment optimization algorithm will automatically reassign and change the frequency reuse pattern of the beams as two aerial platforms approach as mentioned.

Once an aerial platform moves out of the coverage area of the sector with which it is associated and moves into the coverage area of an adjacent sector, then since the cell site beam is still pointing toward the same aerial platform only the function of forming the beam needs to be handed off to the adjacent sector antenna sub-system. In cases of handoff to a different cell site, the cell site to which the aerial platform is handed off is chosen using the same methodology used in assigning aerial platforms to cell sites described in the above iteration. If the data rate of the aerial platform may be enhanced by handing off to another cell site, then the iteration described above for improving the data rates of aerial platforms will automatically handoff the aerial platforms to improve their data rates.

In the above embodiments for assigning aerials platforms to cell sites, the received SINRs and achieved data rates at the aerial platforms were used as the performance metric to evaluate the different assignments. However, the network must verify that for the chosen cell site to aerial platform assignment the cell site receivers for the corresponding assignment also receive adequate data rate. In one embodiment, the SINR received from each aerial platform $j_o$ at the cell site $i_o$ on beam $k_o$ is estimated according to $$SINR = \frac{P_{aj_o} B_{i_o j_o k_o, j_o} A_{i_o j_o, i_o} L_{i_o j_o}}{\sum_{j, j \neq j_o, (FCH((i,j), FRP(q)) = FCH((i_o, j_o), FRP(q)))} P_{aj} B_{i_o j_o k_o, j} A_{ij, i_o} L_{i_o, j} + I_{i_o k_o, Ext} + W_{i_o j_o} N_o} \quad (9)$$

the data rate achievable for the corresponding SINR is computed, and if the computed data rate is below a threshold, $i_o$ is removed from the set $CS(j_o)$, and a new assignment is generated according to the above embodiments using the new sets $CS(j_o)$. This process is continued until an assignment that optimizes the specified network performance criterion and also meets the return link data rate requirement, is found.

In the above embodiments for assigning aerial platforms to cell sites, received SINR at the aerial platform receivers were used to compute data rates, and the network performance metric was defined to be a function of aerial platform data rates. However, a person of ordinary skill in the art will readily recognize that received SINRs at the cell sites, or a combination of the SINRs at the aerial platform and at the cell sites may also be used as the signal quality metric in assigning aerial platforms to cell sites, without departing from the scope of the disclosure. Moreover, signal quality metrics other than SINR, and other network performance metric functions, may also be used in the above embodiments without departing from the scope of the disclosure.

What is claimed is:

1. A system to provide broadband access to aerial platforms, the system comprising:
   a network of cell sites that each comprise at least one radio transceiver, each radio transceiver transmitting at least a reference signal;
   a plurality of aerial platforms that each comprise a radio transceiver, each radio transceiver measuring a signal quality metric of at least one reference signal:
   a set of Modulation Constellation and Code Rate (MCCR) indices, each MCCR signifying a modulation constellation and an error correction code rate;
   a forward link divided into frames, each frame further divided into a number of time slots, at least one data packet is transmitted in each frame, each data packet identified by a sequence number;
   each aerial platform radio transceiver determining an MCCR with a highest data rate from a set of MCCRs that achieve a packet error rate below a specified threshold given a signal quality metric value;
   each cell site radio transceiver encoding a data packet using the MCCR, and transmitting the data packet to an aerial platform radio transceiver;
   the aerial platform radio transceiver sending an acknowledgment message to a cell site radio transceiver if the data packet is decoded correctly; and
   the cell site radio transceiver retransmitting the data packet in each consecutive frame until the acknowledgement message is received for the data packet.

2. The system of claim 1, wherein the signal quality metric is a Signal to Interference plus Noise Ratio (SINR).

3. The system of claim 1, wherein the cell site retransmits a data packet during a set of time slot positions within a frame that the data packet was sent in a first transmission.

4. The system of claim 1, the cell site radio transceivers configured to:
   arrange data packets in increasing sequence numbers; and
   retransmit data packets consecutively starting at a first time slot of a frame and in increasing sequence numbers.

5. The system of claim 1, wherein each data packet is preceded by a preamble, the preamble containing the sequence number of the data packet.

6. The system of claim 1, wherein:
   the cell site radio transceivers are configured to send a control packet in each frame that includes the sequence number and the time slots that each retransmitted data packet occupies in a frame; and
   the aerial platform radio transceivers are configured to decode the control packet to determine the time slot in the frame where retransmission of each retransmitted data packet begins.

7. The system of claim 1, the aerial platform radio transceivers further configured to:
   combine, in each symbol position of a data packet, modulation symbols of a data packet and of retransmitted copies of the data packet to form a combined data packet; and
   decode the combined data packet and send the acknowledgement if the combined data packet is correctly decoded.

8. The system of claim 7, the aerial platform radio transceivers further configured to:
   measure a SINR of the reference signal in dB; and
   choose the MCCR with a highest data rate from among MCCRs that achieve a packet error rate below a specified threshold for a received reference signal quality of SINR+3 dB.

9. The system of claim 1, the cell site radio transceivers further configured to:
   encode each data packet according to an MCCR into a number of redundancy symbols, and divide the redundancy symbols into C, an integer, components;
   transmit each component sequentially in consecutive frames; and
   stop transmission of components when the acknowledgement is received for the data packet.

10. The system of claim 9, the aerial platform radio transceivers further configured to:
    decode a data packet using redundancy symbols of all received data packet components after receiving each component of the data packet; and
    send the acknowledgement when the data packet is decoded correctly.

* * * * *